US007999803B2

(12) United States Patent
Goto et al.

(10) Patent No.: US 7,999,803 B2
(45) Date of Patent: Aug. 16, 2011

(54) LIQUID CRYSTAL DISPLAY DEVICE HAVING DRIVE CIRCUIT

(75) Inventors: Mitsuru Goto, Chiba (JP); Yuichi Numata, Mobara (JP); Masato Sawahata, Ichihara (JP); Akira Ogura, Nagara (JP)

(73) Assignee: Hitachi Displays, Ltd., Chiba (JP)

( * ) Notice: Subject to any disclaimer, the term of this patent is extended or adjusted under 35 U.S.C. 154(b) by 935 days.

(21) Appl. No.: 11/889,747

(22) Filed: Aug. 16, 2007

(65) Prior Publication Data

US 2008/0252577 A1 Oct. 16, 2008

Related U.S. Application Data

(63) Continuation of application No. 10/411,110, filed on Apr. 11, 2003, now Pat. No. 7,307,612.

(30) Foreign Application Priority Data

Apr. 24, 2002 (JP) ................................ 2002-121634

(51) Int. Cl.
*G06F 3/038* (2006.01)
*G09G 5/00* (2006.01)

(52) U.S. Cl. ......................... 345/206; 345/204; 345/100

(58) Field of Classification Search ............ 345/87–102, 345/204–206, 211
See application file for complete search history.

(56) References Cited

U.S. PATENT DOCUMENTS

| | | | | |
|---|---|---|---|---|
| 6,252,643 | B1 | 6/2001 | Song | |
| 6,462,723 | B1 | 10/2002 | Yamazaki et al. | |
| 6,617,796 | B2 | 9/2003 | Sasaki et al. | |
| 6,870,590 | B2 * | 3/2005 | Shoji | 349/152 |
| 6,909,413 | B2 | 6/2005 | Nanno et al. | |
| 6,995,758 | B2 * | 2/2006 | Fukuda | 345/205 |

FOREIGN PATENT DOCUMENTS

| | | |
|---|---|---|
| JP | 9-127556 | 5/1997 |
| JP | 2001-109435 | 4/2001 |

* cited by examiner

*Primary Examiner* — Duc Q Dinh
(74) *Attorney, Agent, or Firm* — Stites & Harbison PLLC; Juan Carlos A. Marquez, Esq.

(57) ABSTRACT

The present invention provides a liquid crystal display device which can be used in a miniaturized portable equipment, wherein the liquid crystal display device integrally incorporates a drive circuit therein so that a circuit scale can be miniaturized. A liquid crystal drive circuit includes a first drive circuit and a second drive circuit which is mounted on one side of the liquid crystal display panel. One output of the first drive circuit is connected to a plurality of signal lines and the second drive circuit supplies signals to the first drive circuit. The liquid crystal display panel includes holding capacitive elements and signals are supplied to the holding capacitive elements from the second drive circuit. The second drive circuit includes a booster circuit for supplying signals to the first drive circuit and the holding capacitive elements.

8 Claims, 19 Drawing Sheets

LIQUID CRYSTAL DISPLAY DEVICE HAVING DRIVE CIRCUIT

CROSS-REFERENCE TO RELATED APPLICATIONS

This application is a Continuation Application of U.S. application Ser. No. 10/411,110 filed Apr. 11, 2003, now U.S. Pat. No. 7,307,612. Priority is claimed based on U.S. application Ser. No. 10/411,110 filed Apr. 24, 2002, which claims the priority of Application No. JP 2002-121634 filed on Apr. 24, 2002, all of which is incorporated by reference.

BACKGROUND OF THE INVENTION

The present invention relates to a liquid crystal display device, and more particularly to a technique which is effectively applicable to drive circuits of a liquid crystal display device used in a portable display device.

Liquid crystal display devices of STN (Super Twisted Nematic) type or of TFT (Thin Film Transistor) type have been popularly used as display devices of notebook type personal computers or the like. The liquid crystal display device includes a liquid crystal display panel and drive circuits for driving the liquid crystal display panel.

Among these liquid crystal display devices, the number of liquid crystal display devices which are used as display devices of portable terminal devices such as mobile telephones or the like is increasing. To use the liquid crystal display devices as the display devices of the portable terminal devices, further miniaturization and high definition are requested compared to conventional liquid crystal display devices.

As the liquid crystal display device which can realize the miniaturization and the high definition, there has been known a liquid crystal display device which uses polysilicon TFTs as switching elements and forms drive circuits on a substrate on which pixel electrodes are also formed (hereinafter referred to as "drive circuit integral type liquid crystal display device").

In the display devices of the portable terminal devices such as the mobile telephones, along with spreading of electronic mails attached with images, further enhancement of image display functions such as high image quality, high definition and the like is demanded. Further, in view of the nature of these display devices that they are used as the portable terminals, further low power consumption is also demanded. Still further, it is also a crucial task of the display devices which are used as the portable terminals to strengthen the competitiveness in cost.

As a problem which arises along with the miniaturization of the portable terminal device, the decrease of a space for mounting drive circuits of the liquid crystal display device is named. Further, with respect to a method for mounting the drive circuits, there has been a demand for so-called screen centering, that is, an arranging method in which a center line of the device and the center of a display screen are superposed to each other. This screen centering restricts positions where drive circuits are mounted and hence, it is necessary to pay sufficient consideration to the arrangement of the display devices. Further, in the conventional liquid crystal display device, although the drive circuits have been arranged at two neighboring sides of the display screen, there is a demand for mounting the drive circuits only at one side, that is, so-called three-side-free mounting. Further, it is also necessary to decrease the number of mounting parts for decreasing mounting areas as well as for lowering a manufacturing cost.

Seeking of the high definition in the miniaturized display device arises a problem that a pitch per one pixel is small and hence, numerical aperture of each pixel is reduced. Further, when the number of pixels is increased along with the increase of a screen size, there arises a problem that the performance of the drive circuits cannot follow a driving speed or a problem that a circuit size is increased and a pull-around length of wiring for signal and power source is increased and hence, the distortion of signal waveforms and the influence of noises cannot be ignored.

SUMMARY OF THE INVENTION

The present invention provides a technique to realize optimum drive circuits in a miniaturized liquid crystal display device.

The present invention is directed to a liquid crystal display device which includes a liquid crystal display panel and liquid crystal drive circuits, wherein the liquid crystal drive circuits are comprised of a first drive circuit which is formed by a step substantially equal to a step for forming the liquid crystal display panel and a second drive circuit which is mounted on one side of the liquid crystal display panel, and one output of the first drive circuit is capable of being connected with n pieces of signal lines, and the second drive circuit is capable of supplying signals to the first drive circuit. Further, holding capacitive elements are provided to the liquid crystal display panel and signals are supplied to the holding capacitive elements from the second drive circuits.

Further, the second drive circuit includes a booster circuit for supplying signals to the first drive circuit and the holding capacitive elements.

DESCRIPTION OF THE PREFERRED EMBODIMENTS

Preferred embodiments of a liquid crystal display device according to the present invention are explained in detail hereinafter in conjunction with drawings. Here, in all drawings served for explaining the embodiments, parts having identical functions are given same symbols and their repeated explanation is omitted.

Figure 1:
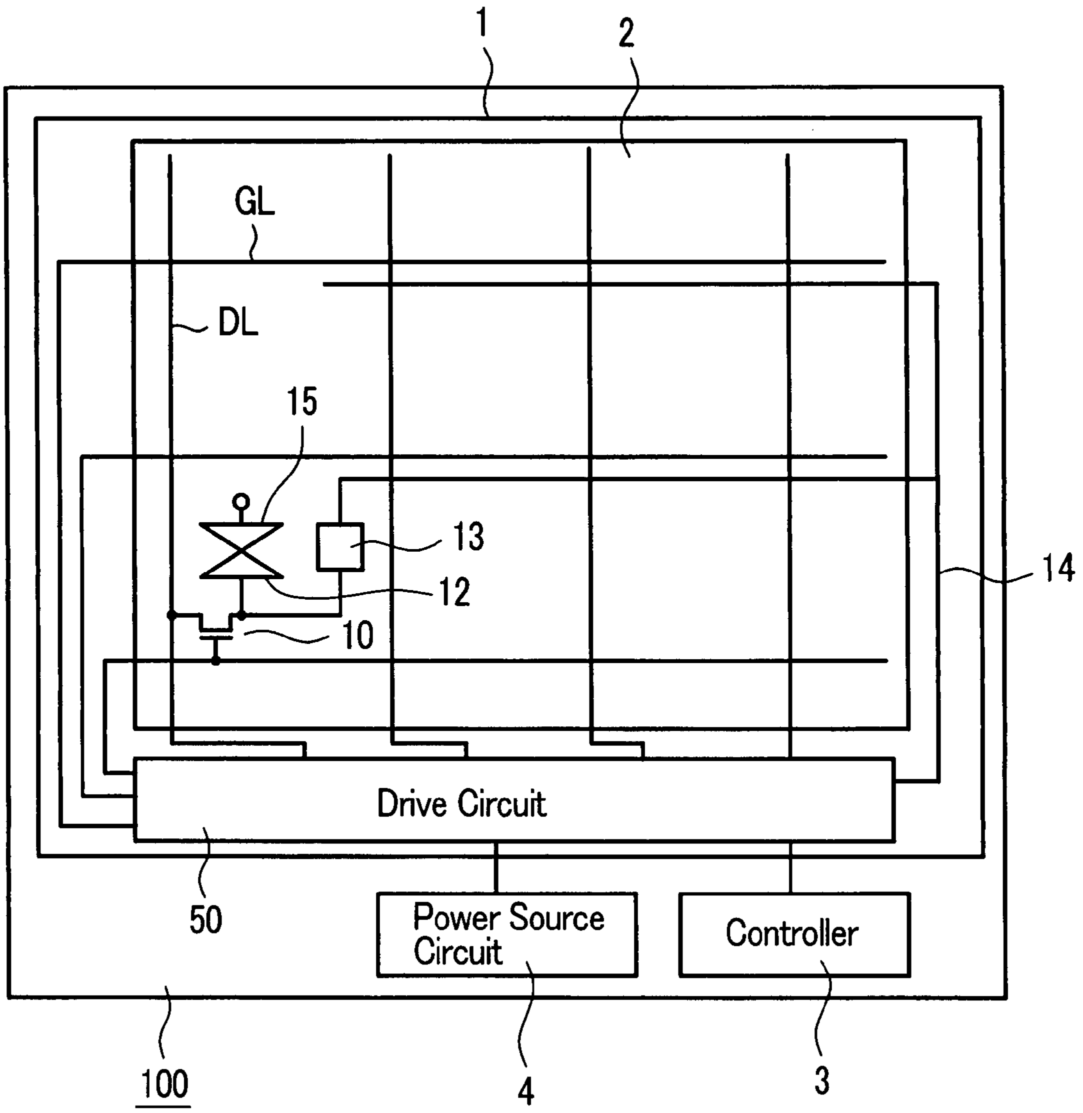
FIG. 1 is a schematic block diagram showing a liquid crystal display device of an embodiment of the present invention.

FIG. 1 is a block diagram showing the basic constitution of a liquid crystal display device of the embodiment of the present invention. As shown in the drawing, the liquid crystal display device 100 of this embodiment includes a liquid crystal display panel 1, a controller 3, a power source circuit 4 and a drive circuit 50.

The liquid crystal display panel 1 is constituted such that a TFT substrate 2 on which pixel electrodes 12, thin film transistors 10, holding capacitive elements 13 and the like are formed and a filter substrate (not shown in the drawing) on which color filters and the like are formed are overlapped to each other with a given gap therebetween, both substrates are laminated to each other by a sealing member which is formed in a frame shape in the vicinity of peripheral portions of both substrates, liquid crystal is filled into and sealed in a space defined between both substrates and inside the sealing member through a liquid crystal filling port formed in a portion of the sealing member, and polarizers are laminated to outsides of both substrates. Here, this embodiment is applicable to both of a so-called lateral electric field type liquid crystal display panel in which counter electrodes 15 are formed on the TFT substrate 2 and a so-called vertical electric field type liquid crystal display panel in which counter electrodes 15 are formed on the filter substrate.

Each pixel is constituted of the pixel electrode 12 and the thin film transistor 10 and is formed corresponding to a portion where a plurality of scanning signal lines (or gate signal lines) GL and a plurality of video signal lines (or drain signal lines) DL cross each other.

The thin film transistor 10 of each pixel has a source thereof connected to the pixel electrode 12, a drain thereof connected to the video signal line DL, and a gate thereof connected to the scanning signal line GL. The thin film transistor 10 functions as a switch for supplying display voltages (gray scale voltages) to the pixel electrode 12. Further, the holding capacitive element 13 is connected to the pixel electrode 12. The holding capacitive element 13 constitutes an element for holding a voltage written in the pixel electrode 12.

Here, although naming of "source" and "drain" may be reversed depending on the bias relationship, the terminal which is connected to the video signal line DL is referred to as "drain".

The controller 3, the power source circuit 4 and the drive circuit 50 are electrically connected to one another on a transparent insulating substrate (grass substrate, resin substrate or the like) which constitutes the TFT substrate 2 of the liquid crystal display panel 1. Digital signals (display data, clock signals and the like) transmitted from the controller 3 and power source voltages supplied from the power source circuit 4 are inputted to the drive circuit 50.

The controller 3 is constituted of a semiconductor integrated circuit (LSI) and controls and drives the drive circuit 50 based on respective display control signals including clock signals, display timing signals, horizontal synchronizing signals and vertical synchronizing signals and display data (R, G, B) which are transmitted from the outside.

The drive circuit 50 is constituted of a semiconductor integrated circuit (LSI) which is formed on a substrate different from the TFT substrate 2 or a semiconductor circuit which is formed on the same substrate as TFT substrate 2. This drive circuit 50 performs driving of the scanning signal lines GL, driving of the video signal lines DL and supplying of signals to the holding capacitive elements 13 through holding capacitance signal lines 14.

In response to a frame starting instruction signal (FLM, also referred to as starting signal hereinafter) and a shift clock (CL1) which are transmitted from the controller 3, the drive circuit 50 supplies a selection scanning voltage (scanning signal) of High level to respective scanning signal lines GL of the liquid crystal display panel 1 sequentially every 1 horizontal scanning time (hereinafter referred to as H). Accordingly, a plurality of thin film transistors 10 which are connected to respective scanning signal lines GL of the liquid crystal display panel 1 assume a conductive state during 1 horizontal scanning time 1 H.

Further, the drive circuit 50 outputs a gray scale voltage corresponding to a gray scale to be displayed by the pixel to the video signal line DL. When the thin film transistor 10 assumes the ON state, the gray scale voltage (video signal) is supplied to the pixel electrode 12 from the video signal line DL. Thereafter, when the thin film transistor 10 assumes the OFF state, the gray scale voltage based on an image to be displayed by the pixel is held at the pixel electrode 12.

The holding capacitive element 13 generates capacitance between an electrode connected to the pixel electrode 12 and an electrode connected to the holding capacitance signal line 14 and holds the gray scale voltage inputted to the pixel electrode 12 based on this capacitance. Conventionally, as a signal supplied through the holding capacitance signal line 14, a voltage which is substantially equal to a common voltage (VCOM) which is supplied to the counter electrode 15 is supplied. In this embodiment, however, as a signal which is supplied through the holding capacitance signal line 14, a voltage which is rather higher than the gray scale voltage to be supplied to the pixel electrode is supplied.

Figure 2:
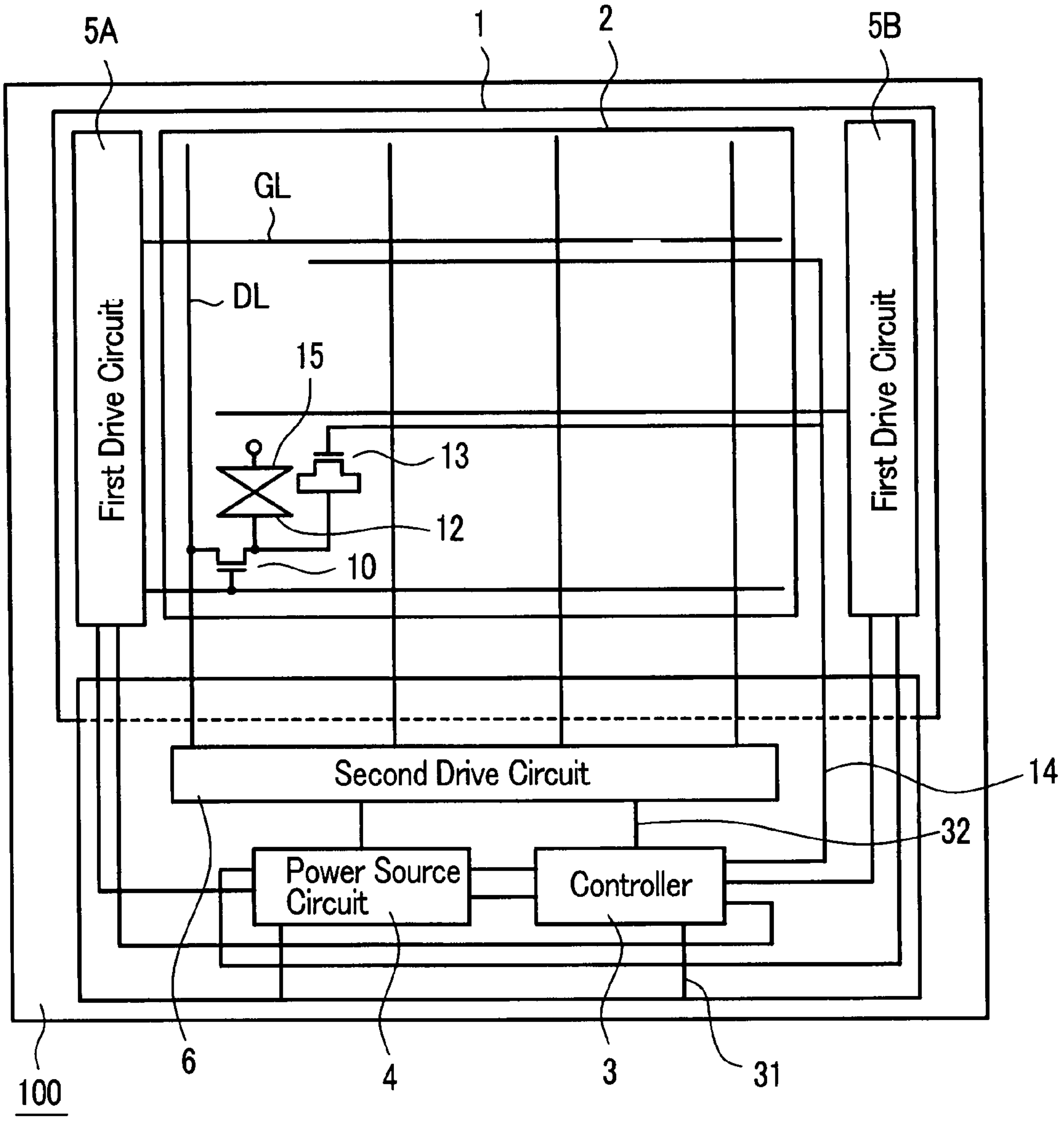
FIG. 2 is a schematic block diagram showing a liquid crystal display device of an embodiment of the present invention.

FIG. 2 is an embodiment which divides the drive circuit shown in FIG. 1 to two drive circuits. In FIG. 2, the drive circuit is constituted of a first drive circuit 5 which is formed on the TFT substrate 2 and a second drive circuit 6 which is formed on a substrate different from the TFT substrate 2 and is connected to the liquid crystal display panel 1. With respect to the first drive circuit 5, first drive circuits 5A, 5B which output scanning signals to the scanning signal lines GL are provided separately at left and right sides of the TFT substrate 2 in the drawing. Further, the second drive circuit 6 is a circuit for supplying gray scale voltages to the video signal lines DL and is provided at a lower side in the drawing.

Here, the first drive circuit 5 is a circuit which is formed in a step substantially equal to a step for forming TFT, while the second drive circuit 6 is an integrated circuit which is formed on an silicon substrate or the like, is formed in a step separate from the step for forming TFT for pixel, and constitutes a circuit which is connected to the liquid crystal display panel 1 using an anisotropic conductive film or the like after completion of the liquid crystal display panel 1.

Although the first drive circuits 5A, 5B which output the scanning signals to the scanning signal line GL are provided separately at left and right sides of the TFT substrate 2 in FIG. 2, it may be possible to use only one first drive circuit for outputting the scanning signal to the scanning signal line GL and to provide such a drive circuit to either one of left and right sides of the TFT substrate 2. Further, the first drive circuit may be provided at the lower side of the TFT substrate 2 in the drawing.

In the constitution shown in FIG. 2, the drive circuit which drives the scanning signal lines GL is provided at extensions of the scanning signal lines GL (left and right sides of the liquid crystal display panel 1 in the drawing). However, with respect to a portable electronic equipment such as a mobile telephone, since a lateral width of a display screen portion is narrow and an equipment design which is favorably accepted by a user has to be chosen, there exists a demand that the center of the display screen is positioned on a center line of the equipment, that is, so-called screen centering is required. Accordingly, in view of the fact that there exist no sufficient regions for arranging the second drive circuits 5A, 5B at both lateral sides of the display screen, a method which forms the second drive circuits 5A, 5B using a semiconductor manufacturing process is used in the same manner as a method for manufacturing switching elements or the like mounted on the liquid crystal display panel 1.

That is, by simultaneously building the drive circuits at the time of forming the liquid crystal display panel 1, it is possible to form the drive circuit in the relatively narrow region and, at the same time, the constitution of external connection terminals and the like can be omitted. Here, as semiconductor layers capable of forming the drive circuit on the insulating substrate, semiconductor layers such as polysilicon semiconductor layers having the structure of crystal close to single crystal are available.

In FIG. 2, the holding capacitive element 13 can use the constitution which is substantially equal to the constitution of the switching element 10 (MOS cap capacitance). That is, in the switching element 10 provided to the pixel, the gate electrode is overlapped to a source/drain region by way of the semiconductor layer and an insulation film thus forming capacitance (gate parasitic capacitance). The holding capacitive element 13 also has the constitution substantially equal to the constitution of the switching element 10, wherein the gate electrode is overlapped to a source/drain region by way of the semiconductor layer and an insulation film thus forming a capacitive element. As shown in FIG. 2, one electrode which constitutes the holding capacitive element 13 (also referred to as SD-side counter electrode hereinafter) is electrically connected to the pixel electrode due to short-circuiting of the drain region and the source region. Further, another electrode which constitutes the holding capacitive element 13 (G side counter electrode) is formed of the gate electrode.

In this embodiment, the switching element 10 is an n-type transistor and a voltage higher than the voltage applied to the pixel electrode is applied to the gate electrode of the holding capacitive element 13. When the high voltage is applied to the gate electrode of the holding capacitive element 13 through the holding capacitance signal line 14, the electric resistance of the semiconductor layer (channel portion) which constitutes the holding capacitive element 13 is lowered and the semiconductor layer also functions as the electrode of the capacitive element. Particularly, the insulation film (for example, gate oxide film) between the gate electrode and the semiconductor layer has a small film thickness and hence, even when areas of respective electrodes of the holding capacitive element 13 are small compared to those of conventional electrodes, it is possible to obtain sufficient capacitance.

Conventionally, a voltage which is substantially equal to a common voltage supplied to the counter electrode 15 is supplied as the signal supplied to the holding capacitance signal 14. In this embodiment, however, the voltage which is higher than the gray scale voltage supplied to the pixel electrode is supplied and the voltage which is higher than the scanning signal is supplied. When the switching element 10 is formed of the n-type transistor, it is necessary to set a voltage (Vth) which is applied to the gate electrode to turn on the holding capacitive element 13 to a voltage sufficiently higher than the voltage applied to the pixel electrode. That is, the scanning signal which is served for turning on the switching element 10 assumes a voltage higher than the voltage applied to the pixel electrode.

Further, to generate a sufficient inverting layer in the channel portion so as to make the holding capacitive element 13 function as the capacitive element, a voltage (Vsg) which is applied to the G side counter electrode of the holding capacitive element 13 is required to satisfy a relationship Vsg>Vth. That is, the voltage (G side counter electrode voltage) applied to the holding capacitive element 13 is required to be a voltage higher than the high-potential-side voltage of the scanning signal. Accordingly, it is necessary for the power source circuit 4 to generate a power source voltage higher than that of the scanning signal. Here, the detail of a booster circuit which generates the high voltage in the power source circuit 4 is explained later.

Then, problems attributed to the arrangement of respective circuits shown in FIG. 2 are explained. In FIG. 2, since the second drive circuit 6, the controller 3 and the power source circuit 4 are separately provided, there arises a problem on layout of wiring connected to respective circuits. In FIG. 2, the controller 3 is positioned at the right side and the power source circuit 4 is positioned at the left side and hence, it is necessary to arrange the wiring from the controller 3 to the first drive circuit 5A at the left side while avoiding the wiring which is led out from the power source circuit 4. For example, when the wiring is formed on a flexible printed circuit board, it is necessary to use an expensive multi-layered circuit board. Accordingly, respective circuits are formed using the same chip or positions of output terminals are skillfully arranged.

Figure 3:
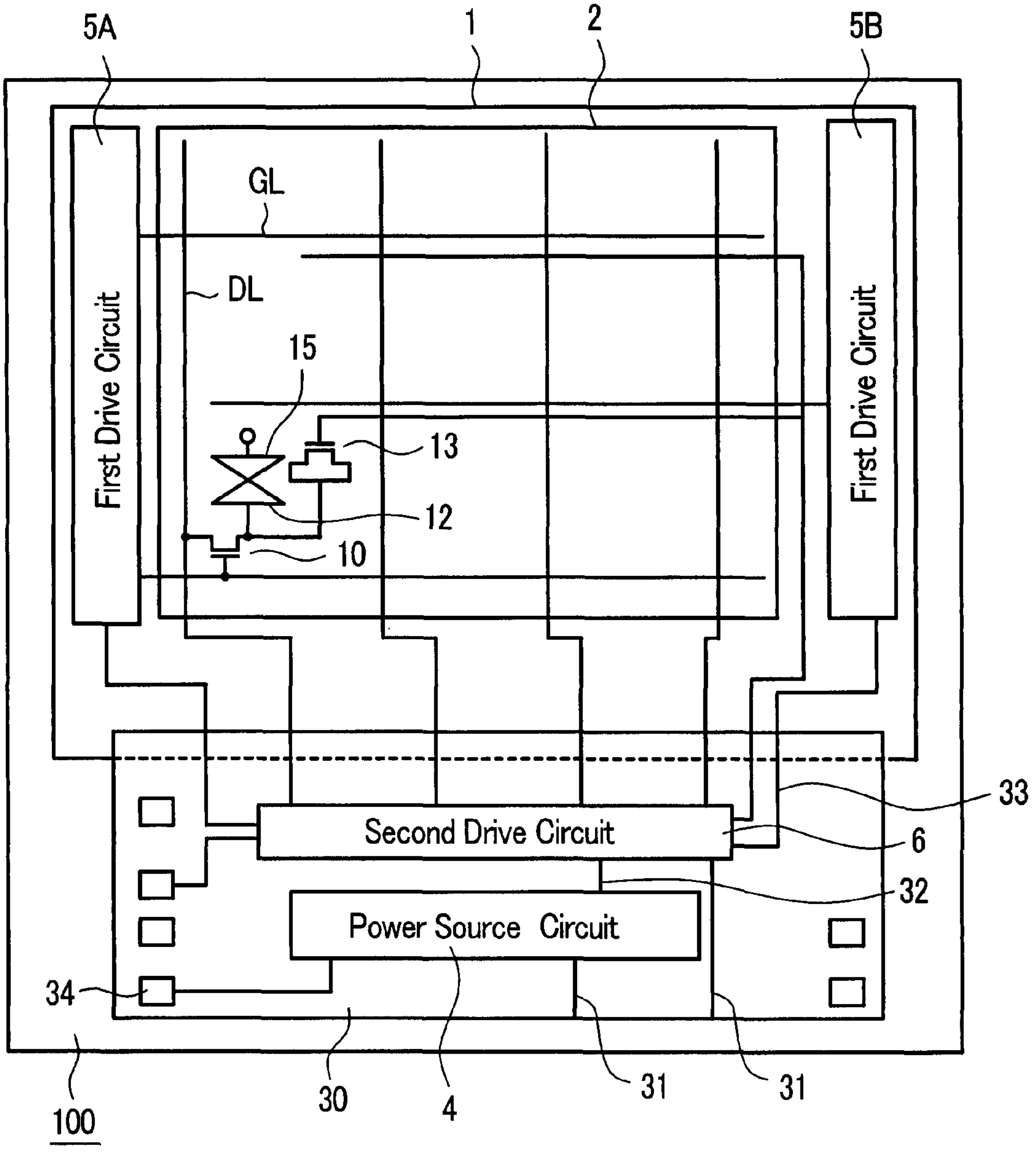
FIG. 3 is a schematic block diagram showing a liquid crystal display device of an embodiment of the present invention.

FIG. 3 shows the constitution in which the controller 3 and the video signal line outputting circuit are formed unitarily as a second drive circuit 6 on one substrate and the second drive circuit 6 is mounted on a flexible printed circuit board 30.

Numeral 31 indicates an input line through which signals are inputted to the second drive circuit 6 and the power source circuit 4 from outside. A line 32 constitutes a line which is served for supplying a voltage from the power source circuit 4 to the second drive circuit and a line 33 constitutes a line which is served for connecting the second drive circuit 6 to the first drive circuit 5. Numeral 34 indicates an externally mounted part such as a capacitor and the externally mounted part 34 necessary for the second drive circuit 6 is mounted on the flexible printed circuit board 30. The booster circuit is incorporated into the power source circuit 4 and a capacitor which is used as the booster circuit is connected to the power source circuit 4.

As shown in FIG. 3, when the controller 3 and the video signal line outputting circuit are unitarily formed as one chip, the wiring on the flexible printed circuit board 30 can be omitted. However, when the high-definition display is adopted and hence, the number of pixels is increased, it is difficult to form the second drive circuit 6 in a miniaturized configuration.

Figure 4:
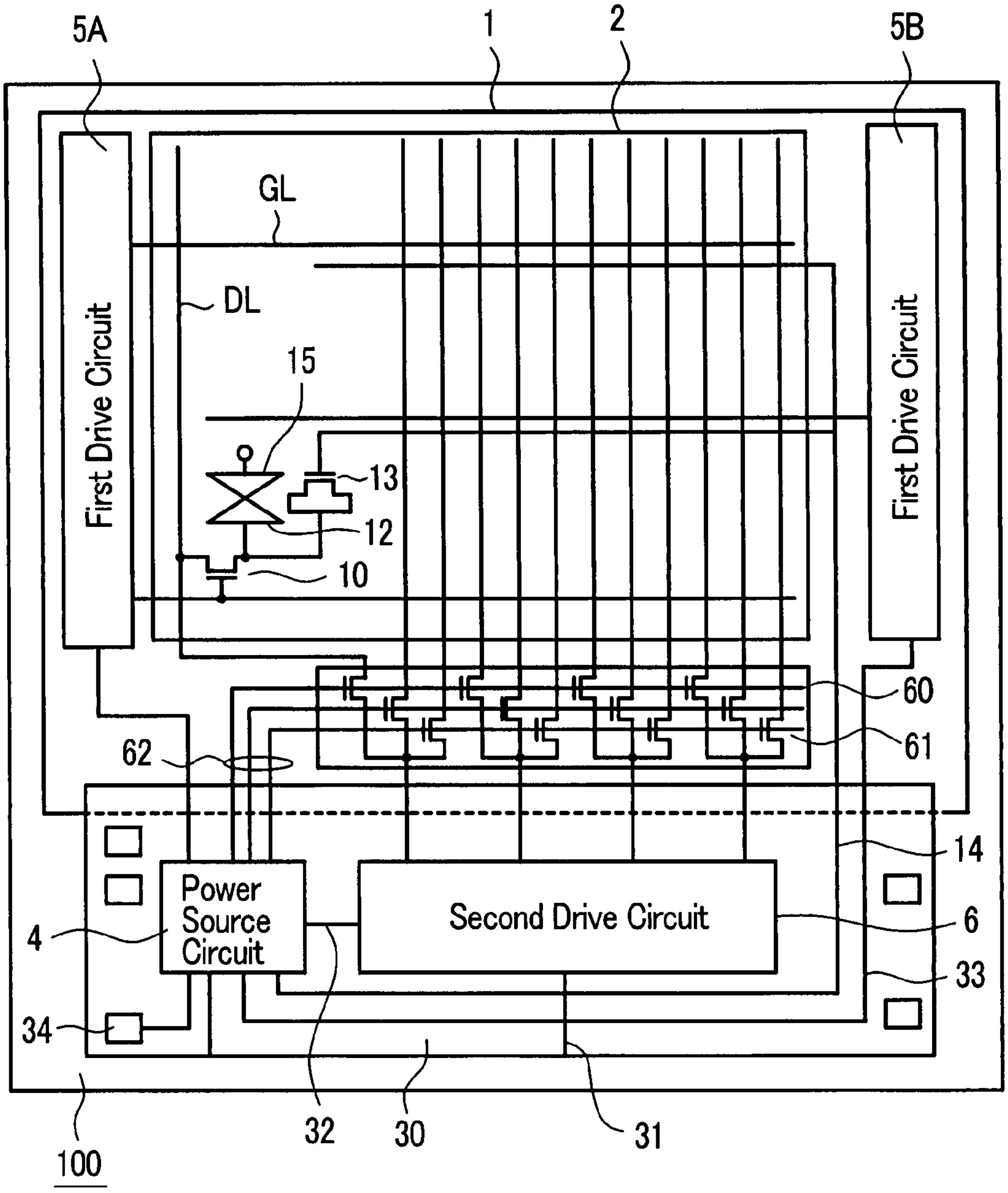
FIG. 4 is a schematic block diagram showing a liquid crystal display device of an embodiment of the present invention.

Then, FIG. 4 is a schematic block diagram which shows the constitution in which a circuit which supplies gray scale voltages to the video signal lines DL is formed on the TFT substrate 2 as a distributing circuit 60.

The second drive circuit 6 shown in FIG. 4 time-sequentially outputs signals to three video signal lines during 1 scanning period 1 H. In the distributing circuit 60, three distributing switching elements 61 are connected to outputs of one second drive circuit 6, wherein by making the distributing switching elements 61 assume the conductive state in order, the signals are supplied in a distributed manner during 1 scanning period 1 H. Numeral 62 indicates distribution control signal lines and a signal which makes the distributing switching elements 61 assume the conductive state is supplied from the power source circuit 4.

By providing the distributing circuit 60 to the liquid crystal display panel 1, the number of outputs from the second drive circuit 6 can be decreased and hence, the circuit size of the second drive circuit 6 can be reduced whereby the chip area can be reduced thus realizing lowering of the manufacturing cost. Further, along with the decrease of the number of outputs, the number of connection portions between the flexible printed circuit board 30 and the liquid crystal display panel 1 can be decreased so that the reliability of connection is also enhanced.

However, it is necessary to supply signals for controlling the distributing switching elements 61. The distributing switching elements 61 have the constitution substantially equal to the constitution of the switching elements 10 of the pixel portion. That is, to control the distributing switching elements 61, a voltage substantially equal to the voltage of the scanning signal is necessary.

In FIG. 4, distributing control lines 62 are connected to the power source circuit 4 and hence, the distributing control signals are supplied from the power source circuit 4 through the distributing control signal lines 62. In the power source circuit 4, the distributing control signals are generated by converting (level shifting) a voltage of the signals supplied from the second drive circuit 6. A high voltage is also applied to the first drive circuits 5A, 5B and the holding capacitive elements 13 from the power source circuit 4. Here, high-voltage control signals outputted from the power source circuit 4 are outputted by performing level shifting of the signals from the second drive circuit 6.

Figure 5:
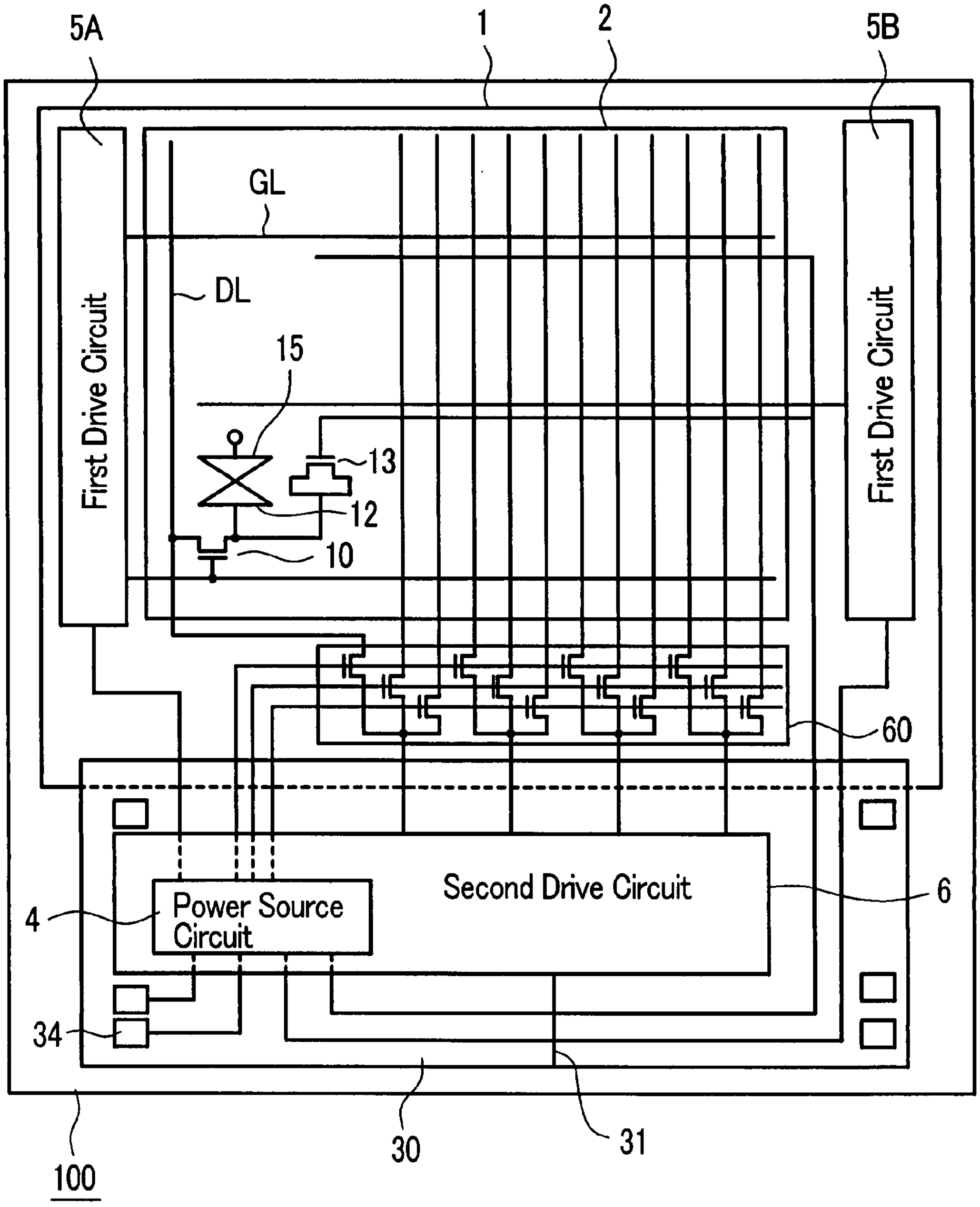
FIG. 5 is a schematic block diagram showing a liquid crystal display device of an embodiment of the present invention.

FIG. 5 is a schematic block diagram showing a case in which the power source circuit 4 is provided to the second drive circuit 6. In FIG. 5, a circuit which outputs gray scale voltages to the video signal lines DL, the controller, and the power source circuit 4 are formed as one chip. That is, the second drive circuit 6 shown in FIG. 5 incorporates a circuit which generates a high voltage therein. Further, a level shifter circuit is also incorporated in the second drive circuit 6. Thus, the second drive circuit 6 outputs the high voltage signals which control the distributing switching elements 61, the first drive circuit and the holding capacitive elements 13.

Figure 6:
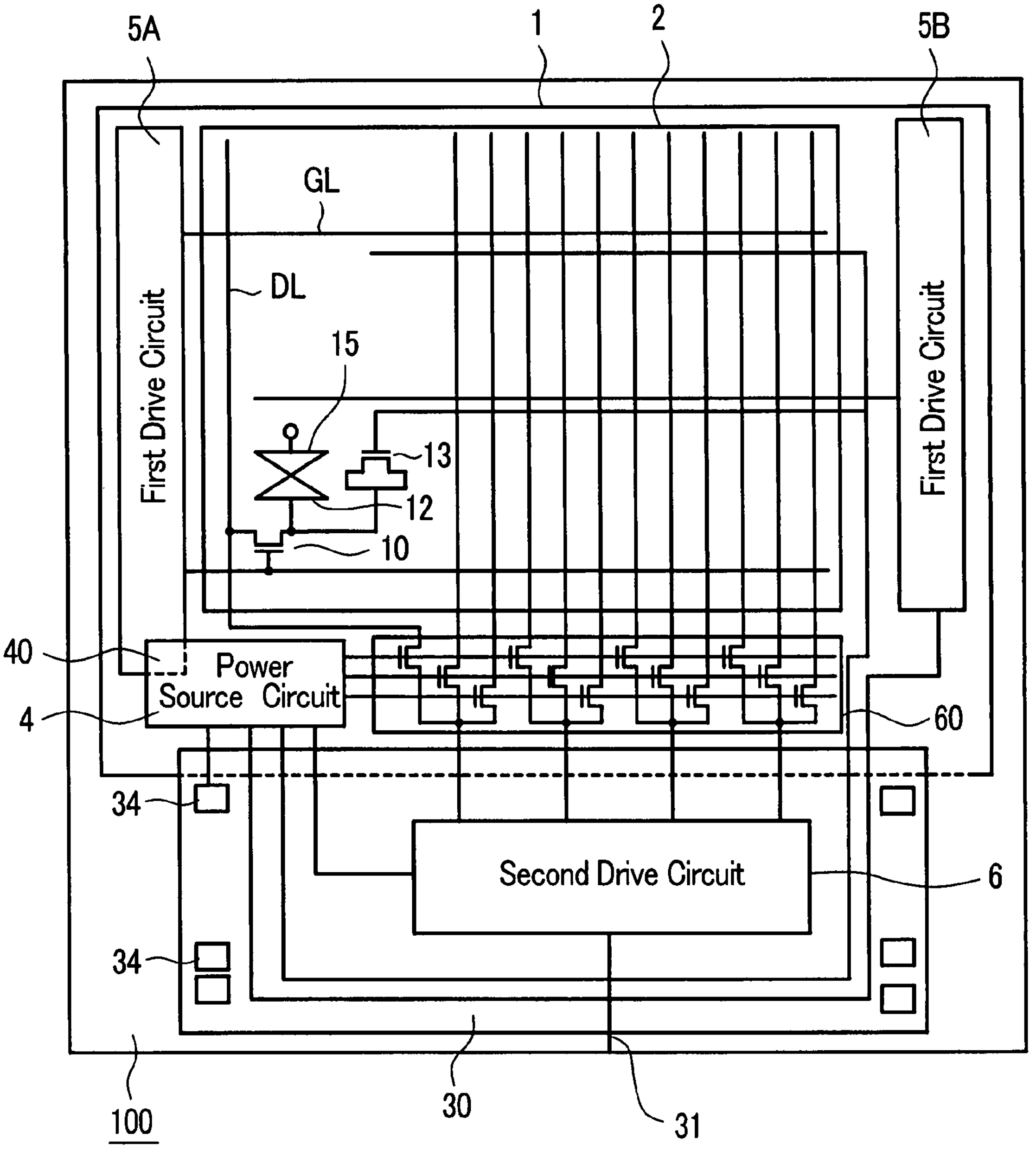
FIG. 6 is a schematic block diagram showing a liquid crystal display device of an embodiment of the present invention.

Subsequently, FIG. 6 is a schematic block diagram which shows the liquid crystal display device 100 on which a chip constituting the power source circuit 4 is mounted. The first drive circuits 5A, SB are formed on the TFT substrate 2 and it is possible to mount a semiconductor substrate on the first drive circuits 5A, 5B by way of an insulation film or the like. Numeral 40 indicates a region where the first drive circuit 5A and the power source circuit 4 are overlapped to each other and a connection between the first drive circuit 5A and the power source circuit 4 is provided to this region. Further, the power source circuit 4 is electrically connected with an externally mounted portion 34 by way of wiring formed on the flexible printed circuit board 30.

Subsequently, the booster circuit used in the power source circuit 4 is explained. In the miniaturized portable equipment such as the mobile telephone or the like, a battery is generally used as a power source. Further, in view of respective amounts of various batteries which are available on a market, the batteries having an output voltage of about 1.5V to 4V are used.

Figure 7:
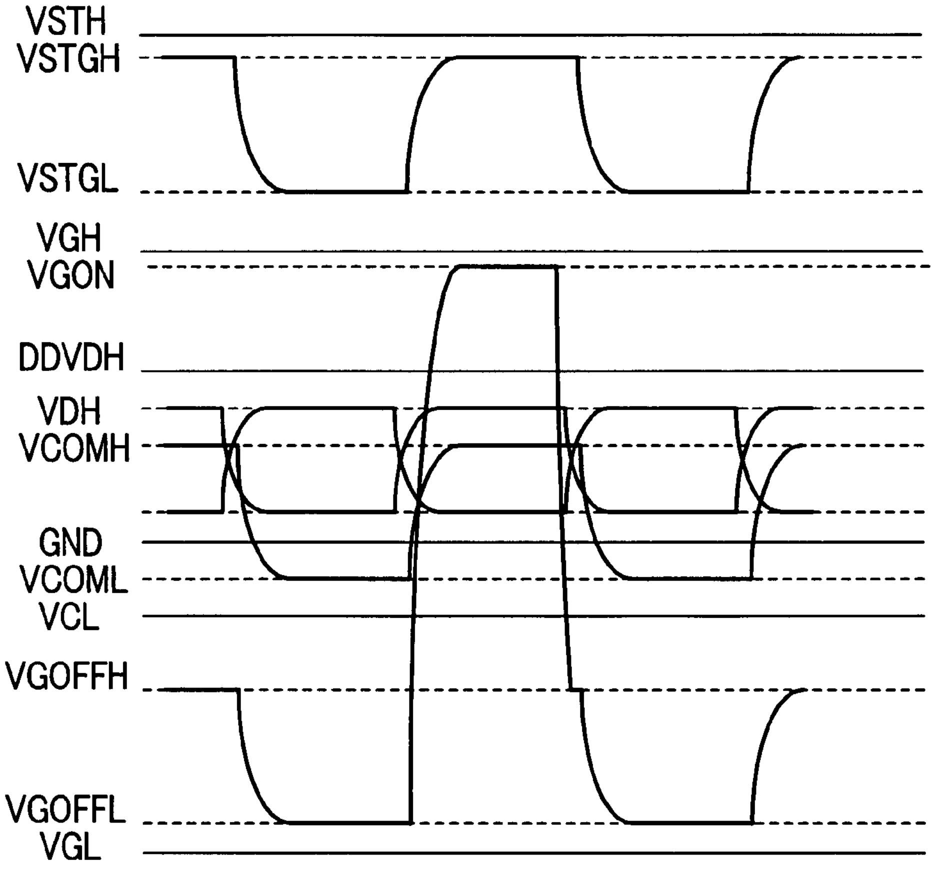
FIG. 7 is a timing chart showing driving waveforms used in a liquid crystal display device of the embodiment of the present invention.

Accordingly, the power source voltage for liquid crystal display device is generated by boosting the battery voltage using the booster circuit. FIG. 7 shows the power source voltage necessary for the thin film transistor type liquid crystal display device. FIG. 7 shows respective driving voltages when a so-called VCOM inversion driving method in which a voltage VCOM which is supplied to the counter electrodes 15 of the liquid crystal display device 100 shown in FIG. 1 to FIG. 6 is inverted at a fixed period.

In FIG. 7, VGON indicates a High voltage of the scanning signal VG for turning on the thin film transistor (TFT) of the pixel portion and about 7.5V is necessary as the High voltage VGON. Further, VGOFF is a voltage for turning off the thin film transistor and a Low voltage of the scanning signal VG. About −5.5V is necessary for the voltage VGOFF. VGH is a High power source for the first drive circuit (gate driver) 5 which outputs the scanning signal VG and VGL is a Low power source for the first drive circuit 5. Since the High voltage VGON of the scanning signal is about 7.5V, the High power source VGH for the first drive circuit 5 assumes 8V, while since the Low voltage VGOFF of the scanning signal is about −5.5V, the Low power source VGL for the first drive circuit 5 is required to assume −6V.

Subsequently, VDH is a gray scale reference voltage. The second drive circuit 6 generates the gray scale voltage using the gray scale reference voltage VDH as the reference. It is necessary to set the gray scale reference voltage VDH to about 5.0V in view of the characteristics of the liquid crystal material. DDVDH is the power source voltage for the second drive circuit (source driver) 6 which is shown in FIG. 4 to FIG. 6. Since the gray scale reference voltage VDH generated by the second drive circuit 6 is 5.0V and the maximum rated voltage of the second drive circuit 6 is 6V, it is necessary to set the power source voltage DDVDH for the second drive circuit 6 to about 5.5V.

VCOMH is a High voltage for counter electrode and VCOML is a Low voltage for counter electrode. It is necessary to set the High voltage VCOMH for counter electrode to 5V or less, while it is necessary to set the Low voltage VCOML for counter electrode to −2.5V. VCL is a voltage generating power source for counter electrode and constitutes a power source voltage for generating the Low voltage VCOML for counter electrode. It is necessary to set the voltage generating power source VCL for counter electrode to about −3V in view of an operational margin of a VCOML generating circuit.

Further, VSTGH and VSTGL are voltages supplied to G-side counter electrodes of the holding capacitive elements 13 and are generated based on a voltage VSTH. As mentioned previously, since the VCOM inversion driving method is adopted, the voltage supplied to the G-side counter electrode of the holding capacitive element 13 also becomes necessary at the High side and the Low side, wherein the voltage VSTGH is the G-side counter electrode High voltage and the voltage VSTGL is the G-side counter electrode Low voltage. To make the holding capacitive element 13 function as the G-side counter electrode voltage, the voltage which is sufficiently higher than that of the scanning signal is applied to the G-side counter electrode. Accordingly, it is necessary to set the voltage VSTH to about 16.5V.

In the above-mentioned power sources necessary for the liquid crystal display device, the power source voltage DDVDH for the second drive circuit 6, the High power source VGH for the first drive circuit 5, the low power source VGL for the first drive circuit 5 the voltage generating power source VCL for the counter electrode, and the voltage VSTH for the holding capacitive element 13 are generated using a charge pump type booster circuit, while other voltages are generated by dividing the voltages generated by the booster circuit or the like.

Figure 8A:
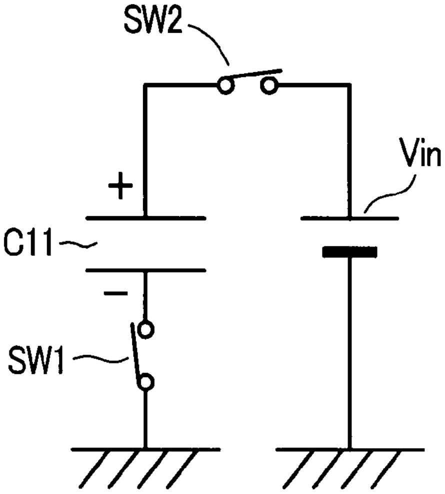
FIG. 8(*a*) and FIG. 8(*b*) are schematic circuit diagrams for explaining booster circuits used in the liquid crystal display device of the embodiment of the present invention, wherein FIG. 8(*a*) is the circuit diagram which shows a state in which booster capacitance is charged and FIG. 8(*b*) is the circuit diagram which shows a state in which holding capacitance is charged.
Figure 8B:
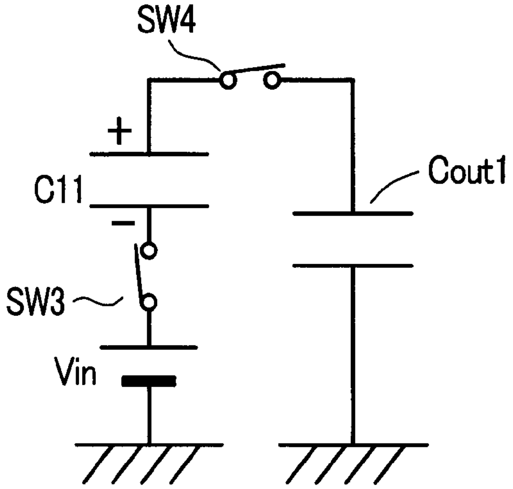

The operational principle of the charge pump type booster circuit is explained in conjunction with FIG. 8(*a*) and FIG. 8(*b*) by taking twofold or double boosting as example. A booster circuit is comprised of an input power source Vin, a booster capacitance C11, a holding capacitance Cout1, and changeover switches SW1, SW2 and realizes the charge state shown in FIG. 8(*a*) and the discharge state shown in FIG. 8(*b*) by a changeover switch. First of all, in the charge state shown in FIG. 8(*a*), one electrode of the booster capacitance C11 is connected to the GND potential by the changeover switch SW1 and other electrode of the booster capacitance C11 is connected to the input power source Vin by the changeover switch SW2, and the booster capacitance C11 is connected to the input power source Vin in parallel. Due to such a constitution, the charge corresponding to the input power source Vin is charged into the booster capacitance C11.

Subsequently, in FIG. 8(*b*), to the electrode which is connected to the GND potential of the booster capacitance C11 in FIG. 8(*a*), the input power source Vin is connected in series to apply the input power source Vin by operating the changeover switch SW3. Here, other electrode of the booster capacitance C11 assumes a voltage 2×Vin which is twice as large as the input power source Vin. The holding capacitance Cout1 is connected to the booster capacitance C11 and the input power source Vin in parallel by operating the changeover switch SW4. Due to such a constitution, the voltage of 2×Vin is held in the holding capacitance Cout1.

Then, here studied is a case in which, in the booster circuit shown in FIG. 8, the power source voltage DDVDH (about 5.5V) for the second drive circuit 6, the High power source VGH (about 7.5V) for the first drive circuit 5, the Low power source VGL (about −6.0V) for the first drive circuit 5, the voltage generating power source VCL for the counter electrode (about −3V), and the voltage VSTG for the holding capacitive element 13 (about 16.5V) are generated.

Assume the input power source Vin as 3V, since the power source voltage DDVDH (about 5.5V) for the second drive circuit 6 is about twice as high as the input power source Vin, the booster circuit which doubles the input power source Vin is necessary. Since such double boosting is not sufficient for the High power source VGH (about 7.5V) for the first drive circuit 5, the booster circuit which can triple the input power source Vin is necessary. Since the Low power source VGL for the first drive circuit 5 is about −6V, the booster circuit which magnifies the input power source Vin by −2 times becomes necessary, while since the power source VCL for generating the counter electrode voltage is about −3V, the booster circuit which magnifies the input power source Vin by −1 times becomes necessary. Further, as the voltage VSTG (about 16.5V) for the holding capacitive element 13, the booster circuit which magnifies the input power source Vin of 3V by 6 times is used.

Figure 9:
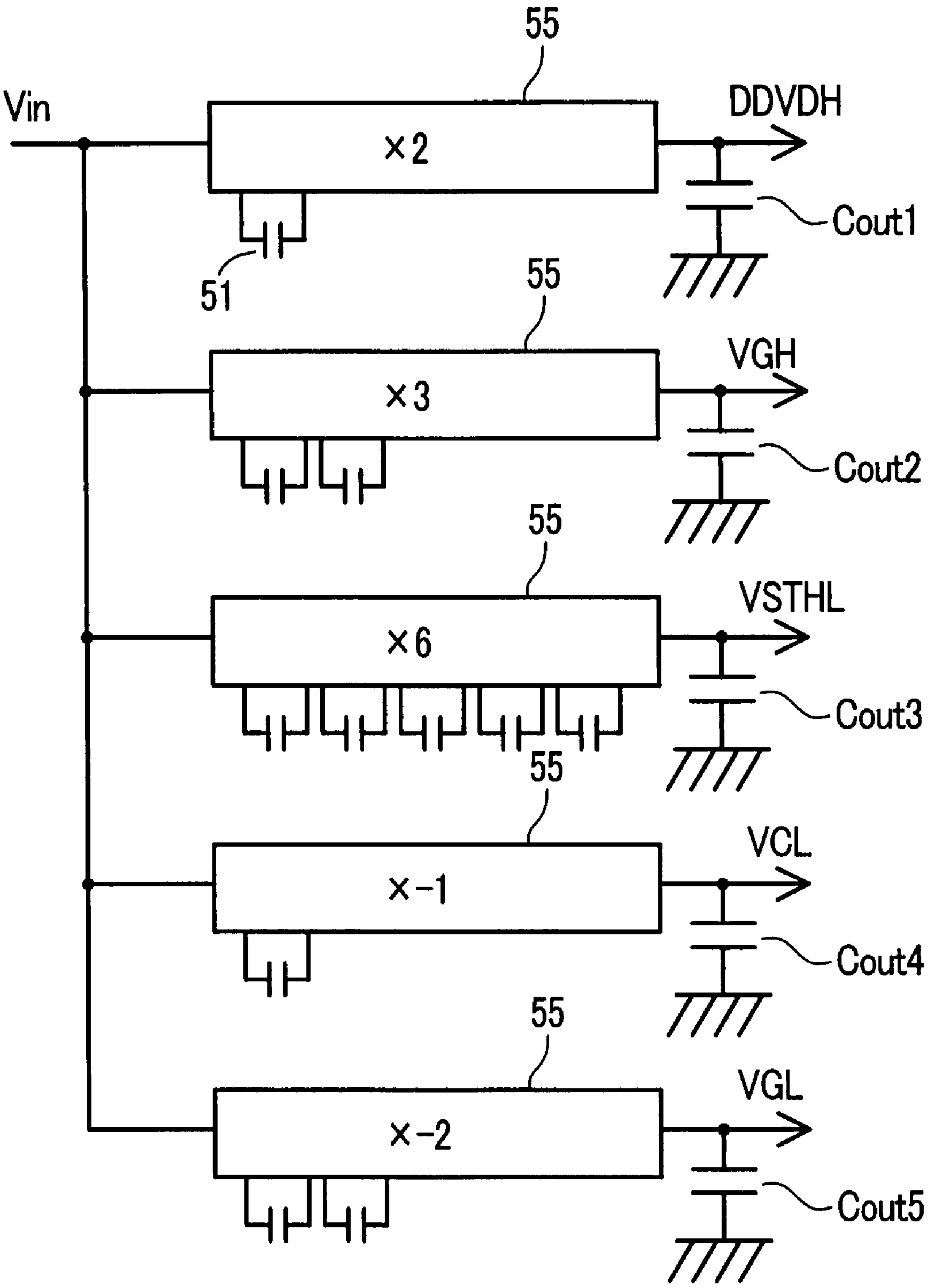
FIG. 9 is a schematic circuit diagram for explaining a booster circuit used in the liquid crystal display device of the embodiment of the present invention.

FIG. 9 shows the constitution of the booster circuit 55 which magnifies the input power source Vin by 2 times, 3 times, 6 times, −2 times and −1 time. It does not mean boosting in a strict sense that Vin is magnified by −2 times or −1 time. Here, however, the booster circuit means a circuit which generates a voltage different from an input voltage. In the circuit shown in FIG. 9, as externally mounted parts of the circuit, a large number of capacitors 51 are used. When the number of mounting parts is increased, there arises a problem that the part mounting area is increased. Here, symbols Cout1 to Cout5 indicate holding capacitances for holding output voltages.

Figure 10:
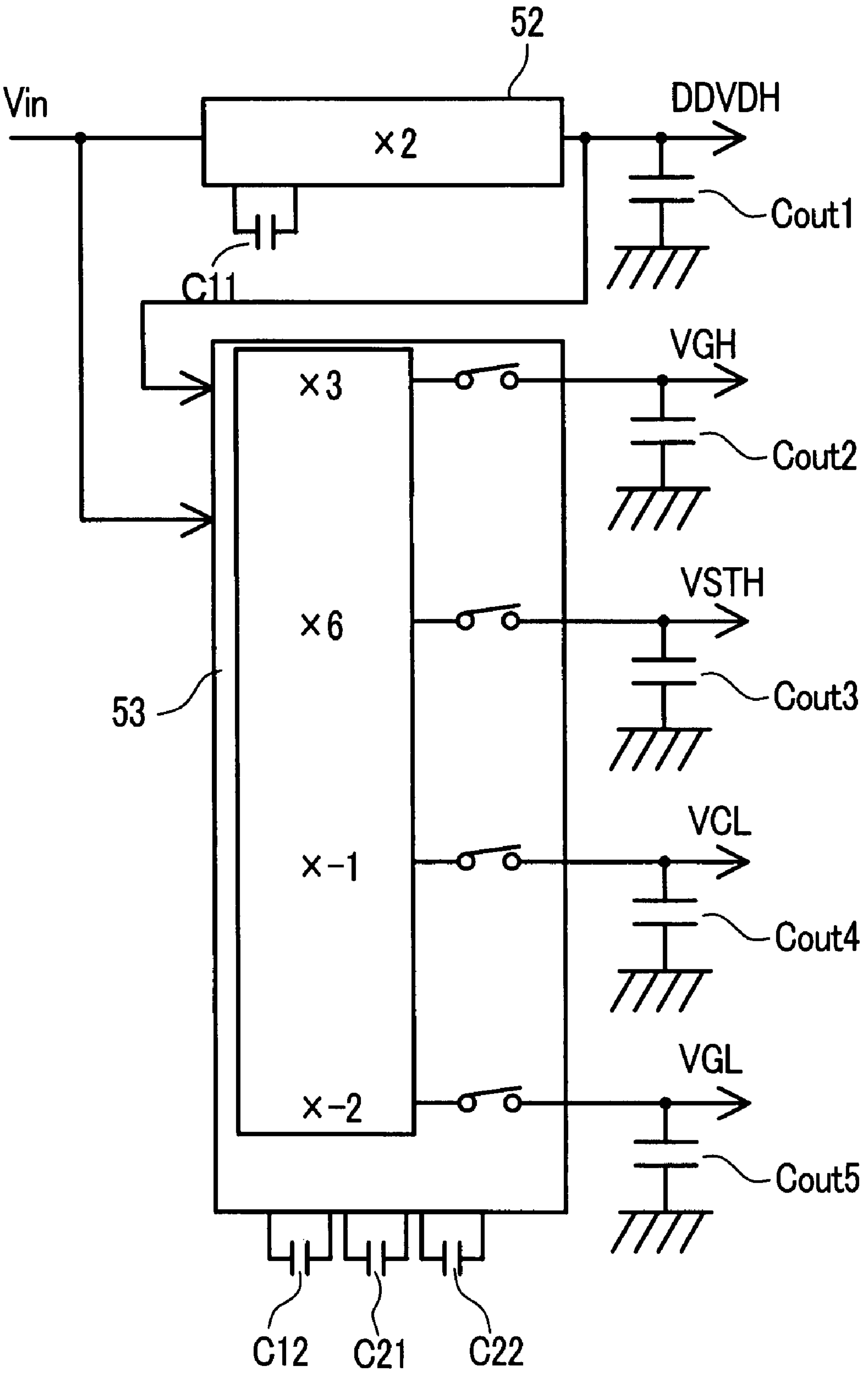
FIG. 10 is a schematic circuit diagram for explaining a booster circuit used in the liquid crystal display device of the embodiment of the present invention.

Subsequently, FIG. 10 is a conceptual block diagram of a circuit which can decrease the number of externally mounted capacitors 51 by making use of the output of the booster circuit 55 as the input power source. Since the input power source Vin is doubled in a booster circuit 52, when the input voltage Vin assumes 3V by making use of an output voltage of the booster circuit 52, that is, by tripling the output voltage of the booster circuit 52 using a booster circuit 53, it is possible to generate a voltage of 18V which is 6 times as large as the input voltage Vin. In the circuit shown in FIG. 10, the externally mounted capacitors are formed of four capacitors consisting of a capacitor C11 connected to the booster circuit 52 and three externally mounted capacitors C12, C21, C22 connected to the booster circuit 53. With respect to the circuit shown in FIG. 9, the number of externally mounted capacitors can be reduced from 11 pieces to 4 pieces. Here, the externally mounted capacitor C11 is for boosting by two times, the externally mounted capacitor C12 is for boosting by 1 time (−1 time), and the externally mounted capacitors C21, C22 are for boosting by 2 times (−2 times).

Figure 11A:
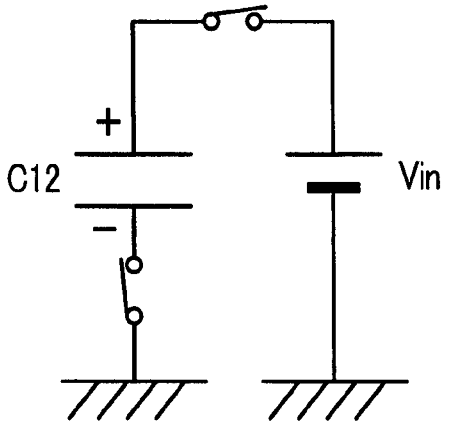
FIG. 11(*a*), FIG. 11(*b*) and FIG. 11(*c*) are schematic circuit diagrams for explaining booster circuits used in the liquid crystal display device of the embodiment of the present invention, wherein FIG. 11(*a*) is the circuit diagram for charging booster capacitance, FIG. 11(*b*) is a booster circuit diagram which doubles an input power source voltage, and FIG. 11(*c*) indicates a booster circuit diagram which triples an input power source voltage.
Figure 11B:
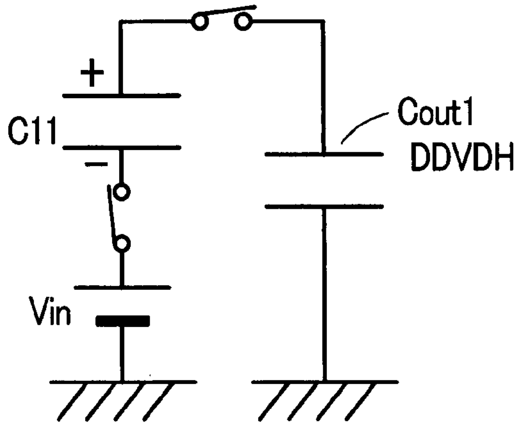
Figure 11C:
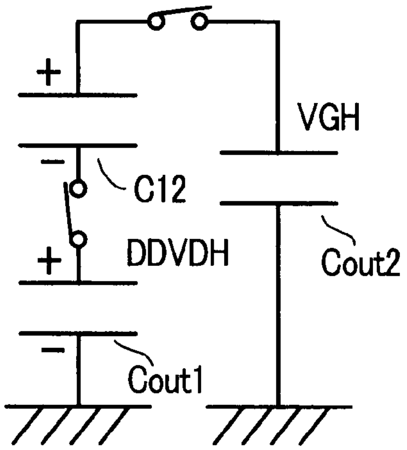

An operation to triple the input power source Vin of the booster circuit 53 is explained in conjunction with FIG. 11(*a*), FIG. 11(*b*) and FIG. 11(*c*). In FIG. 11(*a*), the booster capacitance (externally mounted capacitor) C12 is charged using the input power source voltage Vin. Further, FIG. 11(*b*) shows the booster circuit which doubles the input power source Vin which has been explained in conjunction with FIG. 8 and generates the voltage DDVDH. Thereafter, as shown in FIG. 11(*c*), using the voltage DDVDH which constitutes the output of the holding capacitance Cout 1, the holding capacitance Cout1 and the booster capacitance C12 are connected in series thus generating a voltage which is three times as large as the input power source Vin.

Figure 12B:
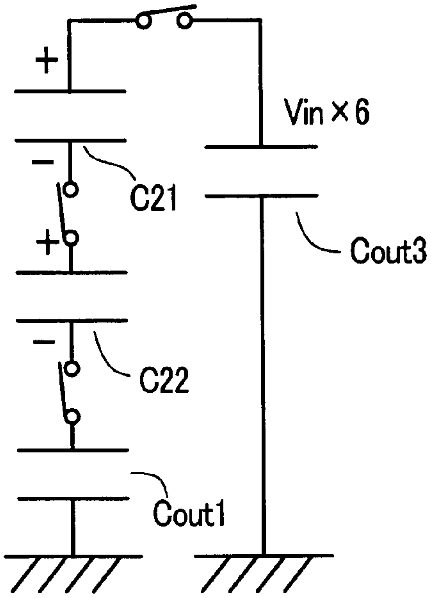
FIG. 12(*a*) and FIG. 12(*b*) are schematic circuit diagrams for explaining booster circuits used in the liquid crystal display device of the embodiment of the present invention, wherein FIG. 12(*a*) is the circuit diagram for charging booster capacitance to holding capacitance and FIG. 12(*b*) is a circuit diagram in which the booster capacitance and the holding capacitance are connected in series.
Figure 12A:
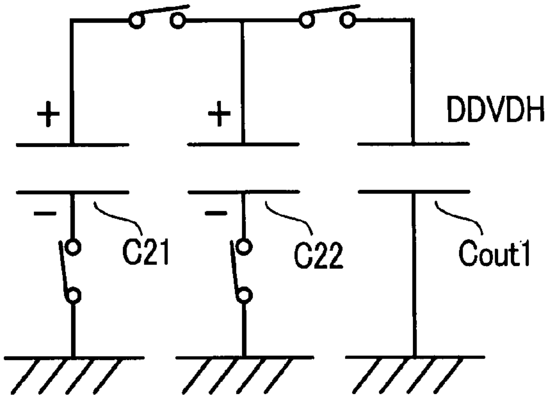

Then, an operation to booster the input power source Vin of the booster circuit 53 by 6 times is explained in conjunction with FIG. 12(*a*) and FIG. 12(*b*). In FIG. 12(*a*), using the voltage DDVDH which constitutes an output of the holding capacitance Cout1 of the booster circuit 52, the booster capacitances C21, C22 are charged to the voltage DDVDH. Thereafter, in FIG. 12(*b*), the booster capacitances C21, C22 and the holding capacitance Cout1 are connected in series thus generating a voltage which is three times as large as the voltage DDVDH and six times as large as the input power source Vin.

Figure 13A:
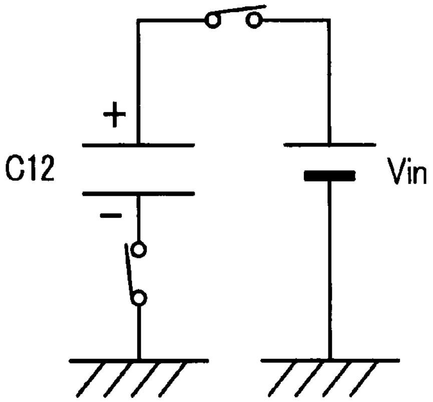
FIG. 13(*a*) and FIG. 13(*b*) are schematic circuit diagrams for explaining booster circuits used in the liquid crystal display device of the embodiment of the present invention, wherein FIG. 13(*a*) is the circuit diagram for charging booster capacitance to holding capacitance and FIG. 13(*b*) is a circuit diagram in which the booster capacitance and the holding capacitance are connected in series.
Figure 13B:
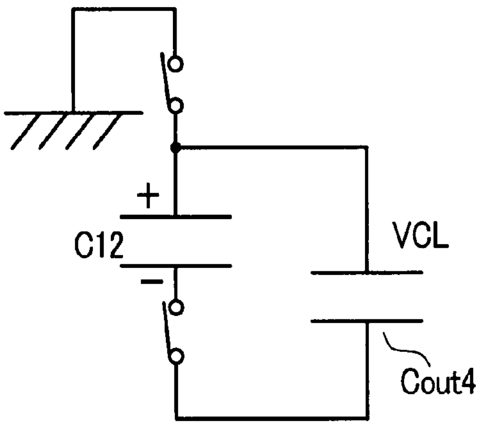

Then, an operation of the booster circuit 55 is explained in conjunction with FIG. 13(*a*) and FIG. 13(*b*). In FIG. 13(*a*), the booster capacitance C12 is charged to the voltage Vin using the input power source Vin. Thereafter, in FIG. 13(*b*), by connecting the positive-polarity-side electrode of the booster capacitance 12 to the GND potential, the voltage VCL having the polarity thereof inverted from that of the input power source Vin is generated. Then, by connecting the booster capacitance C12 and the holding capacitance Cout4 in parallel, the voltage VCL is held in the holding capacitance Cout4.

Figure 14A:
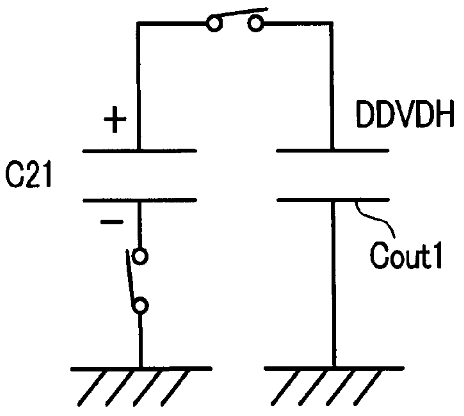
FIG. 14(*a*) and FIG. 14(*b*) are schematic circuit diagrams for explaining booster circuits used in the liquid crystal display device of the embodiment of the present invention, wherein FIG. 14(*a*) is the circuit diagram for charging booster capacitance to holding capacitance and FIG. 14(*b*) is a booster circuit diagram in which the booster capacitance and the holding capacitance are connected in series.
Figure 14B:
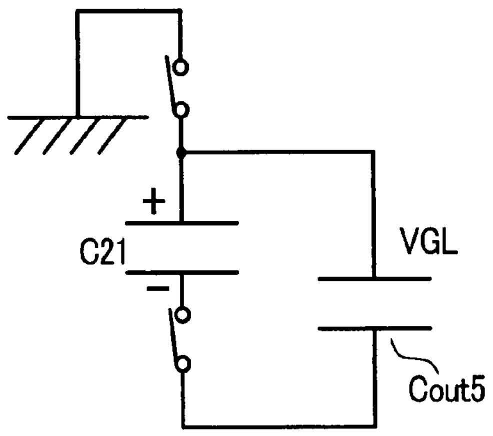

Then, an operation of the booster circuit 53 is explained in conjunction with FIG. 14(*a*) and FIG. 14(*b*). In FIG. 14(*a*), the booster capacitance C21 is charged to the voltage DDVDH using the voltage DDVDH which constitutes the output of the holding capacitance Cout1 of the booster circuit 52. Thereafter, in FIG. 14(*b*), by connecting the positive-polarity-side electrode of the booster capacitance 21 to the GND potential, the voltage VGL having the polarity thereof inverted from that of the voltage DDVDH is generated. Then, by connecting the booster capacitance C21 and the holding capacitance Cout3 in parallel, the voltage VGL is held in the holding capacitance Cout3.

In the booster circuit shown in FIG. 9, to generate the voltage which is boosted by 5 times, for example, 5 capacitors are necessary. That is, the capacitors in number corresponding to the number of boosting times of the voltage to be boosted with respect to the power source voltage is necessary. To the contrary, in the booster circuit shown in FIG. 10, by making use of the boosted voltage which is held by the holding capacitance Cout1, the capacitors can be omitted and hence, the number of parts can be reduced. Further, in the circuits shown in FIG. 13 and FIG. 14, by inverting the connection between the negative-polarity-side voltage and the capacitor and by making use of the input power source Vin in addition to the boosted voltage of the holding capacitance, the capacitors can be used in common and hence, the number of parts is reduced. The reason why the number of capacitors can be omitted and the capacitors can be used in common, is that the liquid crystal display device has a plurality of power sources peculiar to the liquid crystal display device, that is, the power source voltage DDVDH for the first drive circuit 5A, the High power source VGH for the second drive circuit 5B, the Low power source VGL for the second drive circuit 5B, and the power source VCL for generating the counter electrode voltage, and also the liquid crystal display device has the negative-polarity side voltages. Accordingly, by making use of the time-division of the booster capacitances C12, C21, C22, it is possible to use a plurality of booster circuits in common or to make use of the boosted voltage.

Figure 15:
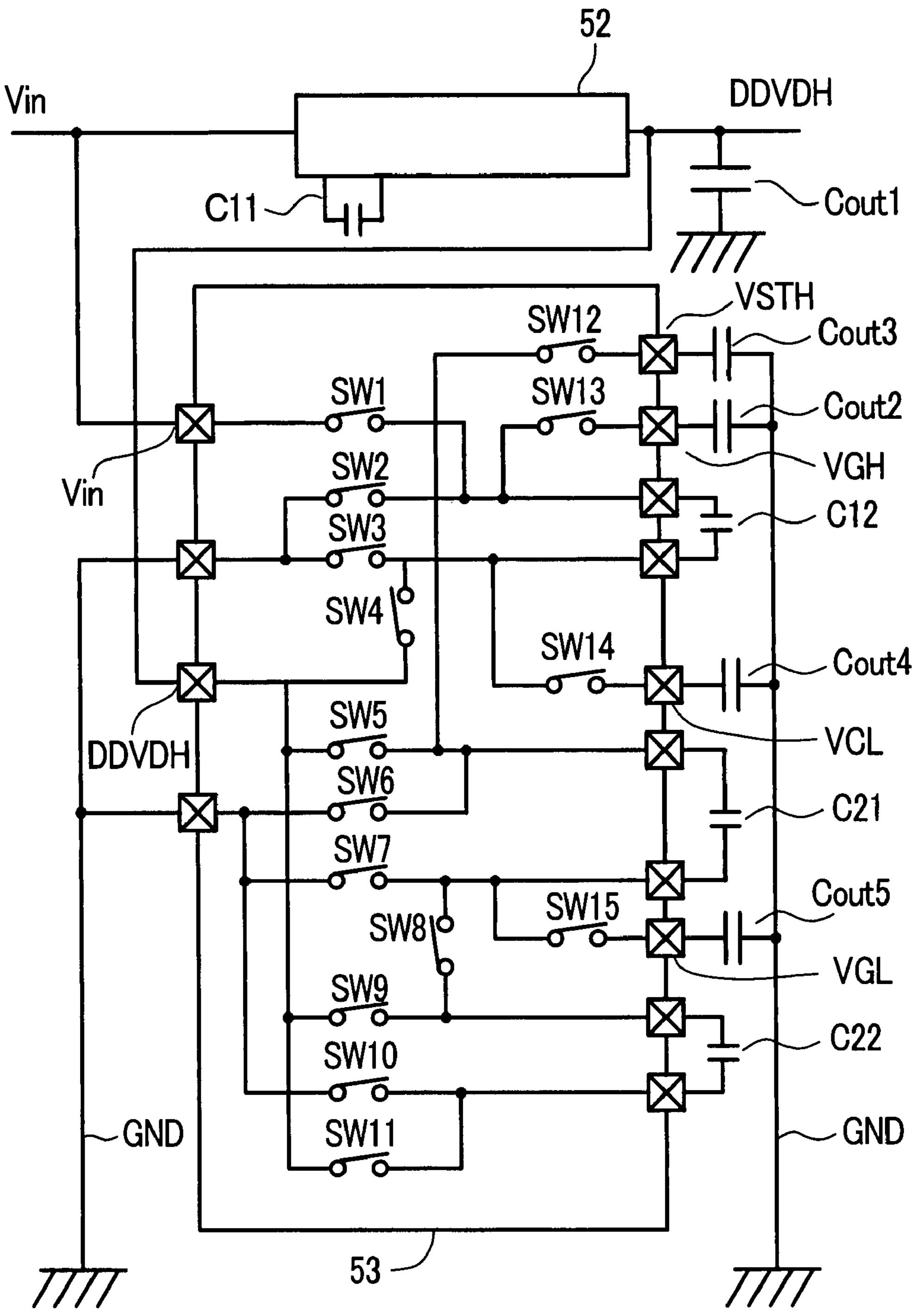
FIG. 15 is a schematic circuit diagram for explaining a booster circuit used in the liquid crystal display device of the embodiment of the present invention.

FIG. 15 shows the more specific constitution of the booster circuit 53 shown in FIG. 10. An operation of the booster circuit 53 is explained hereinafter in conjunction with a timing chart shown in FIG. 16. First of all, a method for realizing the operation shown in FIG. 11 for generating the voltage VGH is explained. To obtain the circuit shown FIG. 11(*a*), a switch SW1 and a switch SW3 shown in FIG. 15 are turned on. When the switch SW1 and the switch SW3 are turned on, the voltage of the input power source Vin is charged to the booster capacitance C12. At this point of time, as in the case of the circuit shown in FIG. 11(*b*), the voltage DDVDH is outputted from the booster circuit 52. Subsequently, to obtain the circuit shown in FIG. 11(*c*), the switch SW1 and the switch SW3 shown in FIG. 15 are turned off, while the switch SW4 shown in FIG. 15 is turned on so as to connect the booster capacitance C12 and the Cout1 in series. At the same time, the switch SW13 is turned on to charge the holding capacitance Cout2.

Then, an operation of the circuit shown in FIG. 12 is explained. To obtain the circuit shown in FIG. 12(*a*), a switch SW5, a switch SW7, a switch SW9 and a switch SW10 in FIG. 15 are turned on so as to charge the booster capacitances C21, C22 with the voltage DDVDH. Subsequently, to obtain the circuit shown in FIG. 12(*b*), the switch SW5, the switch SW7, the switch SW9 and the switch SW10 are turned off and a switch SW11 and a switch SW8 are turned on so as to connect the booster capacitances C21, C22 and the holding capacitance Cout1 in series and, at the same time, a switch SW12 is turned on to charge the holding capacitance Cout3.

Then, an operation of the circuit shown in FIG. 13 is explained. To obtain the circuit shown in FIG. 13(*a*), a switch SW1 and a switch SW3 in FIG. 15 are turned on so as to charge the booster capacitance C12 with the input power source Vin. Subsequently, the switch SW1 and the switch SW3 are turned off and the switch SW2 is turned on thus inverting the polarities of the voltages and, further, the switch SW14 is turned on to charge the holding capacitance Cout4.

Then, an operation of the circuit shown in FIG. 14 is explained. To obtain the circuit shown in FIG. 14(*a*), a switch SW5 and a switch SW7 in FIG. 15 are turned on so as to charge the booster capacitance C21 with the voltage DDVDH. Subsequently, the switch SW5 and the switch SW7 are turned off and the switch SW6 is turned on thus inverting the polarities of the voltages and, further, the switch SW15 is turned on to charge the holding capacitance Cout5.

Figure 16:
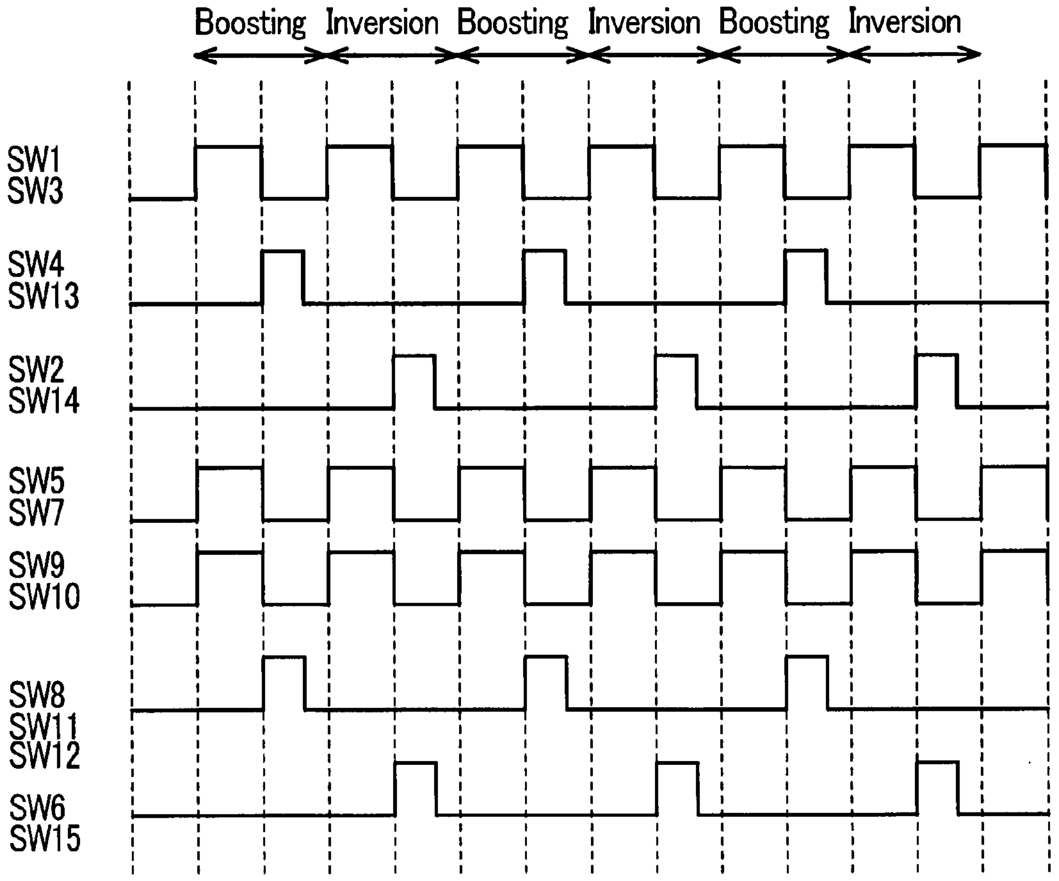
FIG. 16 is a timing chart for explaining an operation of the booster circuit used in the liquid crystal display device of the embodiment of the present invention.

As described above, in the circuit shown in FIG. 15, the booster capacitances C12, C21, C22 are used in common by time division. Further, as shown in FIG. 16, the booster capacitances C12, C21, C22 are repeatedly charged in response to the operation of the switches SW1, SW3, SW5, SW7, SW9 and SW10, are used for the boosting operation in response to the operation of the switches SW4, SW13, SW11 and SW12, and are further used for inversion (boosting) operation in response to the operation of the switches SW2, SW14, SW6 and SW15. In this manner, by enabling the common use of the booster capacitances C12, C21 and C22 in the time-division manner, the number of externally mounted capacitors can be reduced and hence, the number of parts of liquid crystal display device can be reduced.

Figure 17:
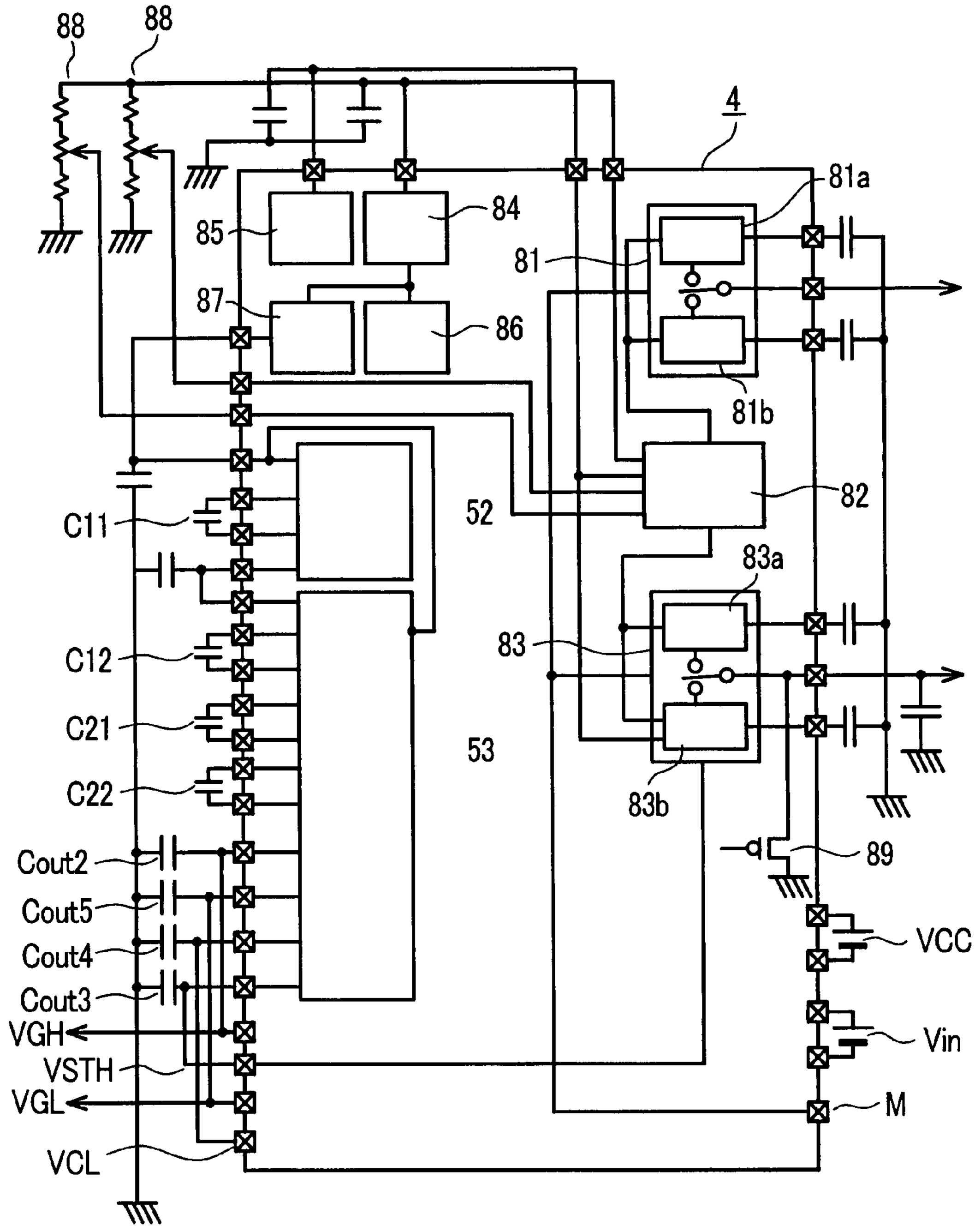
FIG. 17 is a schematic block diagram for explaining a power source circuit used in the liquid crystal display device of the embodiment of the present invention.

Then, a circuit for AC driving is explained. FIG. 17 is a schematic block diagram showing the constitution in which an AC driving circuit is added to the power source circuit 4. In the drawing, numeral 81 indicates a counter electrode voltage outputting circuit, numeral 82 indicates an amplitude adjusting circuit, numeral 83 indicates a holding capacitance signal outputting circuit, numeral 84 indicates a first regulator, numeral 85 indicates a second regulator, numeral 86 indicates an inner reference voltage generating circuit, numeral 87 indicates a reference voltage outputting circuit, and symbol M indicates an AC signal inputting terminal.

The AC driving is performed for the purpose of preventing the degradation of the liquid crystal brought about by applying of the DC voltage to the liquid crystal. In an active matrix type liquid crystal display device in which the voltage is applied between the pixel electrodes and the counter electrodes, as one of methods for performing the AC driving, there has been known a so-called common inversion driving method in which a voltage which is changed to a high voltage and a low voltage at a fixed interval is applied to the counter electrodes, and signal voltages of positive polarity and negative polarity are applied to the pixel electrodes with respect to the counter electrodes.

Figure 18:
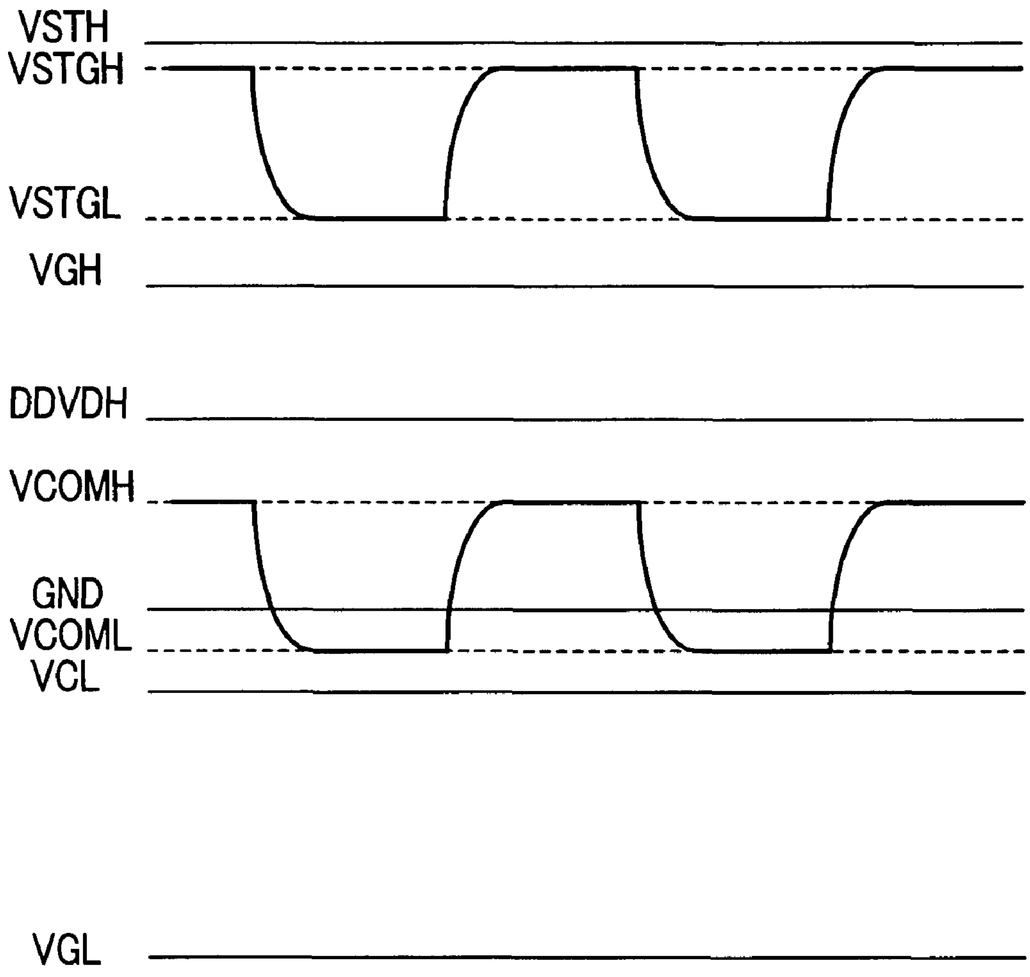
FIG. 18 is a timing chart for explaining signal waveforms outputted from the power source circuit used in the liquid crystal display device of the embodiment of the present invention.

In the circuit shown in FIG. 17, to enable the common inversion driving, the counter electrode voltage outputting circuit 81 is configured such that a voltage which is inverted at a fixed interval can be outputted. An AC signal is transmitted to the counter electrode voltage outputting circuit 81 through an AC signal line 42 and the circuit 81 outputs a counter electrode High level voltage VCOMH and a counter electrode Low level voltage VCOML in response to the AC signal. FIG. 18 shows output waveforms of the counter electrode voltage having the counter electrode High level voltage VCOMH and the counter electrode Low level voltage VCOML.

In response to inverting of the counter electrode, it is necessary to change the voltage of the holding capacitance signal. That is, since the display gray scale is determined based on the potential difference between the pixel electrode and the counter electrode, it is necessary to change the voltage of the holding capacitance signal in response to the timing that the voltage of the counter electrode is changed and the amplitude of the voltage. Accordingly, the AC signal is also transmitted to the holding capacitance signal outputting circuit 83, the amplitude of the voltage which is changed is determined by the amplitude adjusting circuit 82, and a voltage indicative of the reference voltage amplitude is transmitted to the holding capacitance signal outputting circuit 83.

Here, the amplitude adjusting circuit 82 determines the reference voltage amplitude and transmits the reference voltage amplitude to the counter electrode voltage outputting circuit 81 and the holding capacitance signal outputting circuit 83 so that, as indicated by waveforms shown in FIG. 18, it is possible to make the voltage amplitude outputted from the holding capacitance signal outputting circuit 83 match the voltage amplitude outputted from the counter electrode voltage outputting circuit 81.

In the circuit shown in FIG. 17, from the first regulator 84, as the counter electrode High level voltage VCOMH, the reference voltage is supplied to the amplitude adjusting circuit 82 and a High level outputting part 81*a* of the counter electrode voltage outputting circuit 81. In the amplitude adjusting circuit 82, the amplitude reference voltage is generated such that the amplitude reference voltage assumes the amplitude necessary for the counter electrode voltage and, then, the amplitude reference voltage is deducted from the counter electrode High level voltage VCOMH so as to generate the counter electrode Low level voltage VCOML and this voltage VCOML is outputted to a Low level outputting part 81*b*. The counter electrode voltage outputting circuit 81 changes over the connection between the High level outputting part 81*a* and the Low level outputting part 81*b* in accordance with the AC signal and outputs the counter electrode High level voltage VCOMH and the counter electrode Low level voltage VCOML.

Here, the counter electrode voltage outputting circuit 81 and the amplitude adjusting circuit 82 are capable of changing the voltage values of the reference voltage and the amplitude reference voltage of the counter electrode. Further, an adjusting resistor 88 is provided so as to enable the fine adjustment for every liquid crystal display panel.

From the second regulator 85, the reference voltage for holding capacitance signal is supplied to the amplitude adjusting circuit 82 and to the lower level outputting portion 83b of the holding capacitance signal outputting circuit 83 as the holding capacitance signal Low level voltage VSTGL. By generating the amplitude reference voltage in the amplitude adjusting circuit 82 and by adding the amplitude reference voltage to the holding capacitance signal Low level voltage VSTGL, the holding capacitance signal High level voltage VSTGH is generated and is outputted to the High level outputting portion 83*a*. The holding capacitance signal outputting circuit 83 follows the AC signal and changes over the connection between the High level outputting portion 83*a* and the Low level outputting portion 83*b* and outputs the holding capacitance signal High level voltage VSTGH and the holding capacitance signal Low level voltage VSTGL. A fixed current element 89 connected to the output of the holding capacitance signal outputting circuit 83 is a circuit for preventing an undesired display at the time of turning off the power source. The detail of the fixed current element 89 is described later.

The inner reference voltage generating circuit 86 generates a voltage value of the input power source Vin based on the external power source voltage supplied from the battery or the like. Although the input power source Vin is boosted by n times in the booster circuits 52, 53, the fine adjustment is performed in the inner reference voltage generating circuit 86 such that the input power source Vin assumes the optimum voltage with respect to the voltage value outputted from the booster circuits 52, 53. The input power source Vin outputted from the inner reference voltage generating circuit 86 has the current thereof amplified by the reference voltage outputting circuit 87 and, thereafter, is outputted to other circuit.

Figure 19:
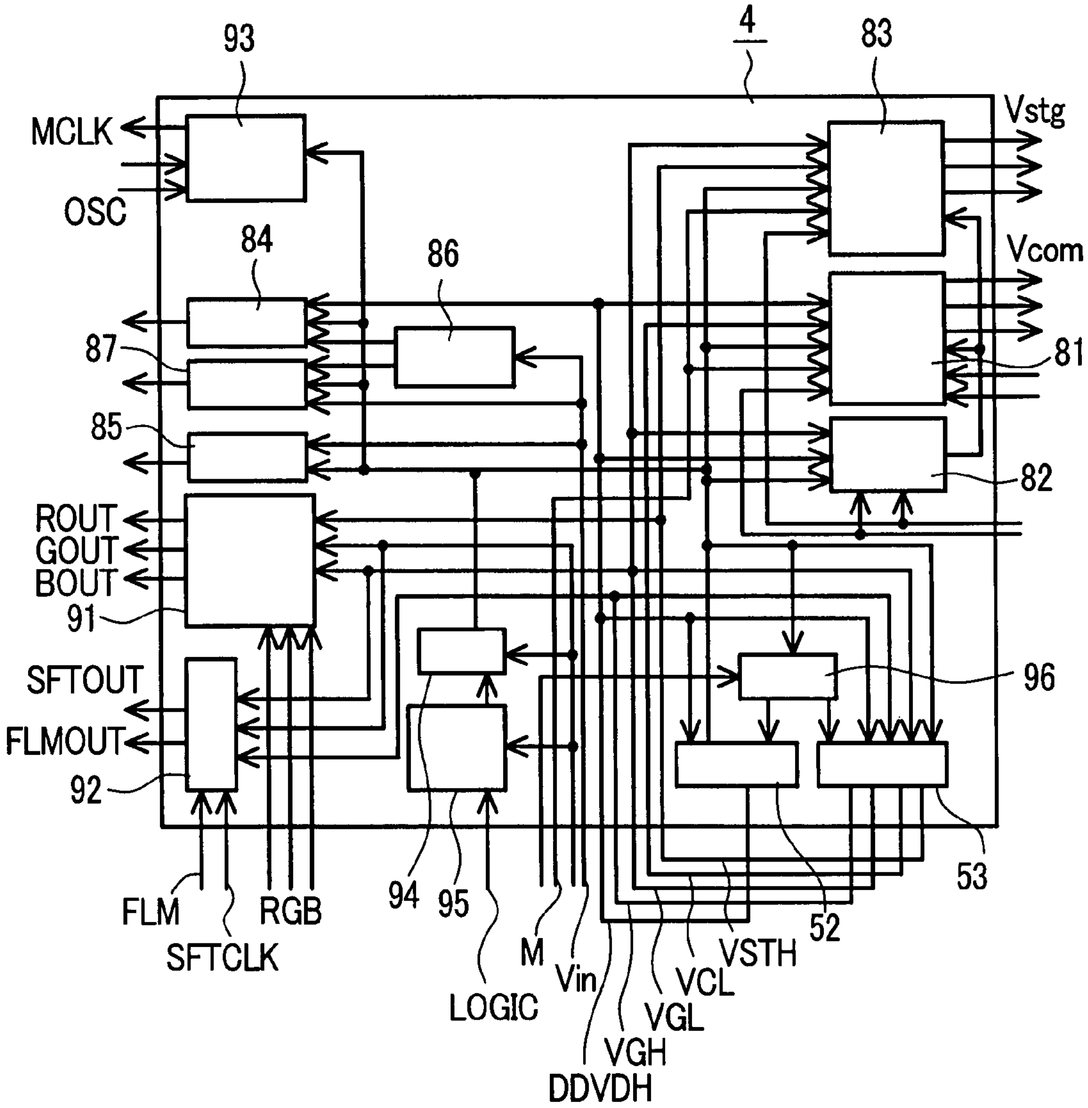
FIG. 19 is a schematic block diagram for explaining a power source circuit used in the liquid crystal display device of the embodiment of the present invention.

Subsequently, FIG. 19 shows the constitution in which the power source circuit 4 includes a level shifter circuit 91 and a mirror-type liquid crystal panel drive circuit 93 for driving three distributing switching elements 61 of the distributing circuit 60.

A signal which drives the distributing switching elements 61 (see FIG. 4) is outputted from the controller, for example. However, since the controller or the like is driven in response to a signal of relatively low voltage, it is necessary to change the voltage level to drive the distributing switching elements 61. Accordingly, the power source circuit 4 inputs signals R, G, B indicative of timing for driving the distributing switching elements 61 from outside and the voltage level is changed by the first level shifter circuit 91 thus outputting these signals as the control signals ROUT, GOUT and BOUT. Further, in the second level shifter circuit 92, the voltages levels of the frame signal FLM and the shift clock SFTCLK for the drive circuit which drives the scanning signal lines are changed thus outputting these signals as the frame signal FLMOUT and the shift clock SFTOUT.

In FIG. 19, numeral 94 indicates a resistor circuit and numeral 95 indicates a serial interface. The serial interface 95 allows inputting of control data from the outside such as the controller and the like thereinto and holds the data in the register circuit 94. Based on the control data held in the register circuit 94, it is possible to control the first regulator 84, the second regulator 85, the amplitude adjusting circuit 82 and the like.

Figure 20A:
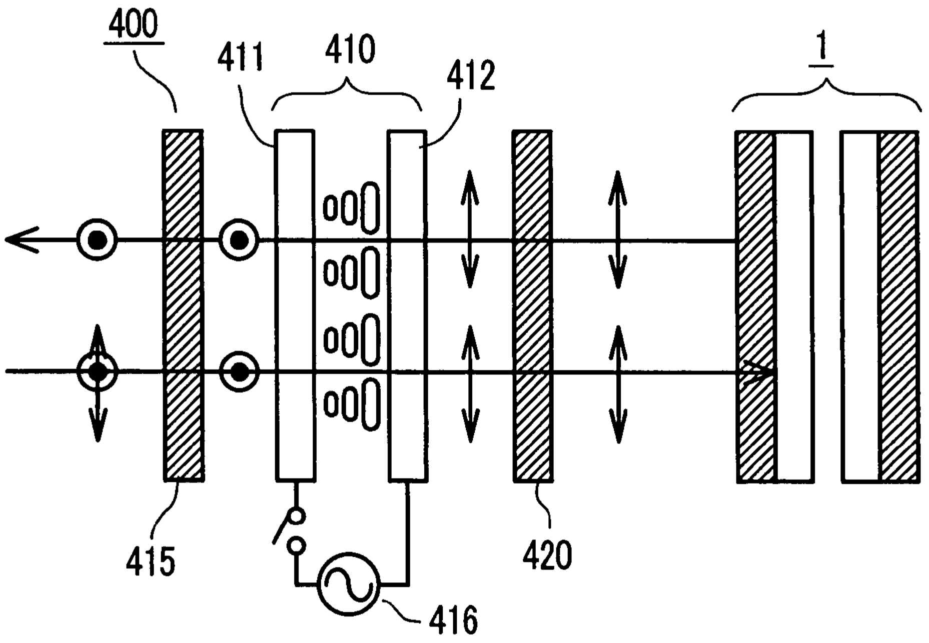
FIG. 20(*a*) and FIG. 20(*b*) are schematic block diagrams for explaining a mirror-use liquid crystal panel used in the liquid crystal display device of the embodiment of the present invention, wherein FIG. 20(*a*) is the schematic view showing the state where incident rectilinear polarized light passes through a reflective-type polarizing portion and FIG. 20(*b*) is the schematic view showing the state where incident rectilinear polarized light reflects on a reflective-type polarizing portion.
Figure 20B:
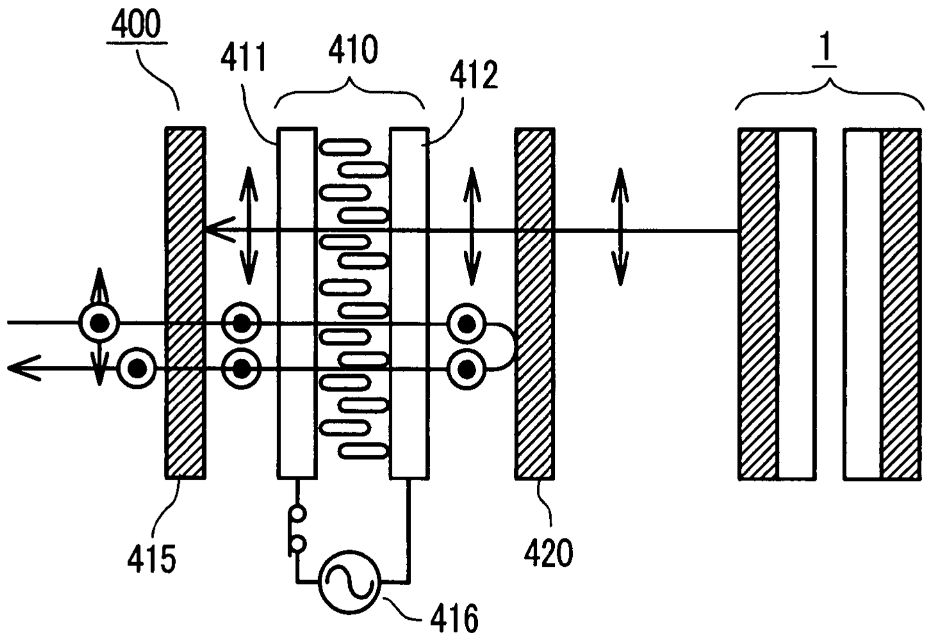

The mirror-type liquid crystal is explained in conjunction with FIG. 20(*a*) and FIG. 20(*b*). In FIG. 20(*a*) and FIG. 20(*b*), numeral 1 indicates the liquid crystal display panel and is served for display. At the side for observing the liquid crystal display panel 1, a mirror-use liquid crystal panel 400 is provided. The mirror-use liquid crystal panel 400 includes a transmission polarization axis variable portion 410, a reflective-type polarization portion 420 and an absorption-type deflection portion 415.

The transmission polarization axis variable portion 410 is capable of controlling the polarization axis of light of the incident rectilinear polarization to a state in which the polarization axis is changed and a state in which the polarization axis is not changed when the light passes through the transmission polarization axis variable portion 410. As shown in FIG. 20(*a*), between the electrodes formed on a pair of substrate 411 and substrate 412, when the voltage from the power source 416 is not applied, the polarization axis of the light of the incident rectilinear polarization is changed and the light passes through the reflective-type polarization portion 420 and reaches the liquid crystal display panel 1. To the contrary, when the light irradiated from the liquid crystal display panel 1 is rectilinear polarized light which passes through the reflection polarization portion 420, the light irradiated from the liquid crystal display panel 1 passes through the mirror-use liquid crystal panel 400 and reaches an observer.

To the contrary, when the voltage is applied between the electrodes formed on the substrate 411 and the substrate 412 shown in FIG. 20(*b*), polarization axis the light of rectilinear polarized light incident on the transmission polarization axis valuable portion 410 is not changed and hence, the light is reflected on the refraction polarization portion 420. On the other hand, when the light irradiated from the liquid crystal display panel 1 is the rectilinear polarized light which passes through the reflection polarization portion 420, the light is absorbed by an absorption-type polarization portion 415 and does not reach the observer.

The voltage applied to the mirror-use liquid crystal panel 400 is subjected to AC driving in the same manner as the liquid crystal display panel 1. Accordingly, the mirror-use liquid crystal panel drive circuit 93 is provided to the power source circuit 4 so as to output a mirror-use liquid crystal panel driving signal MCLK. It is possible to drive the mirror-use liquid crystal panel using frequency which is sufficiently late not to cause a problem on the liquid crystal so that the mirror-use liquid crystal panel drive circuit 93 is driven with low frequency for power saving of the mirror-use liquid crystal panel drive circuit 93. However, since the signal OSC transmitted from the controller and the like is a high frequency signal, the mirror-use liquid crystal panel drive circuit 93 is provided with a frequency dividing circuit.

Subsequently, a circuit preventing the light emission during the display OFF which is provided to the power source circuit 4 is explained. With respect to the refection-type liquid crystal display panel, there exists a problem that due to the charge remaining in the holding capacitance, light is emitted momentarily at the time of turning off the power source. With respect to the transmissive-type liquid crystal display panel, although it is possible to make the emission of light less apparent by turning off the backlight, the emission of light is observed in the semi-transmissive-type liquid crystal display panel and the reflective-type liquid crystal display panel.

The cause of light emission is that since the thin film transistor 10 of the pixel portion is in the OFF state, there is no place that the charge remaining in the pixel electrode 12 is discharged so that when the voltage applied to the holding capacitive element is sharply changed, the voltage between the pixel electrode and the counter electrode is changed and this change is observed as the change of display. Particularly, in the normally black mode, when the voltage is applied between the pixel electrode and the counter electrode, the white display is adopted so that the emission of light becomes apparent.

Figure 21A:
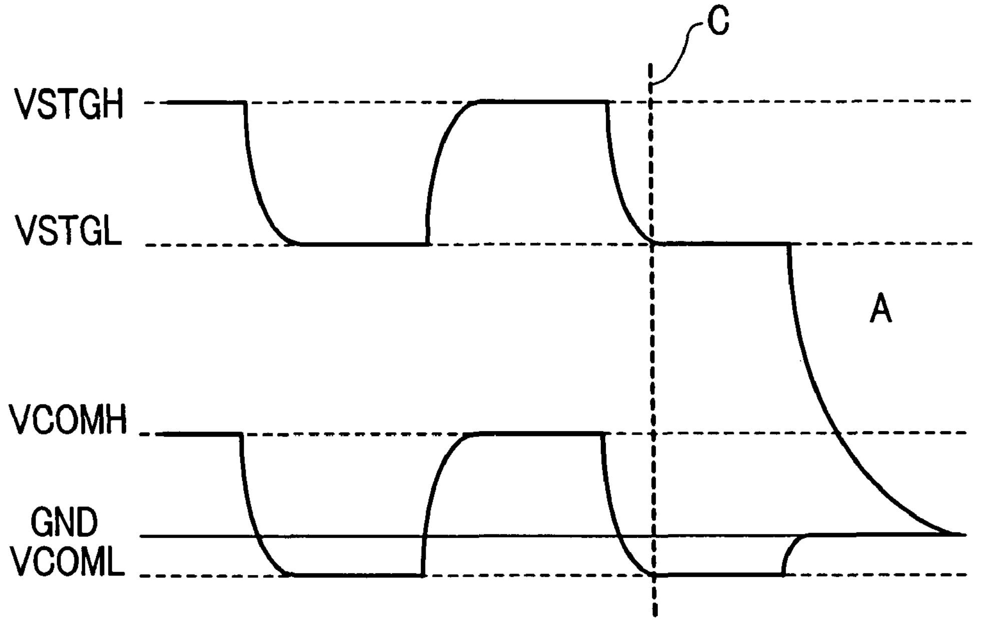
FIG. 21(*a*) and FIG. 21(*b*) are timing charts for explaining an operation of a power source circuit used in the liquid crystal display device of the embodiment of the present invention, wherein FIG. 21(*a*) shows a case in which a high-voltage holding capacitance signal is supplied to a holding capacitive element and FIG. 21(*b*) shows a case in which a scanning signal is supplied to the holding capacitive element.
Figure 21B:
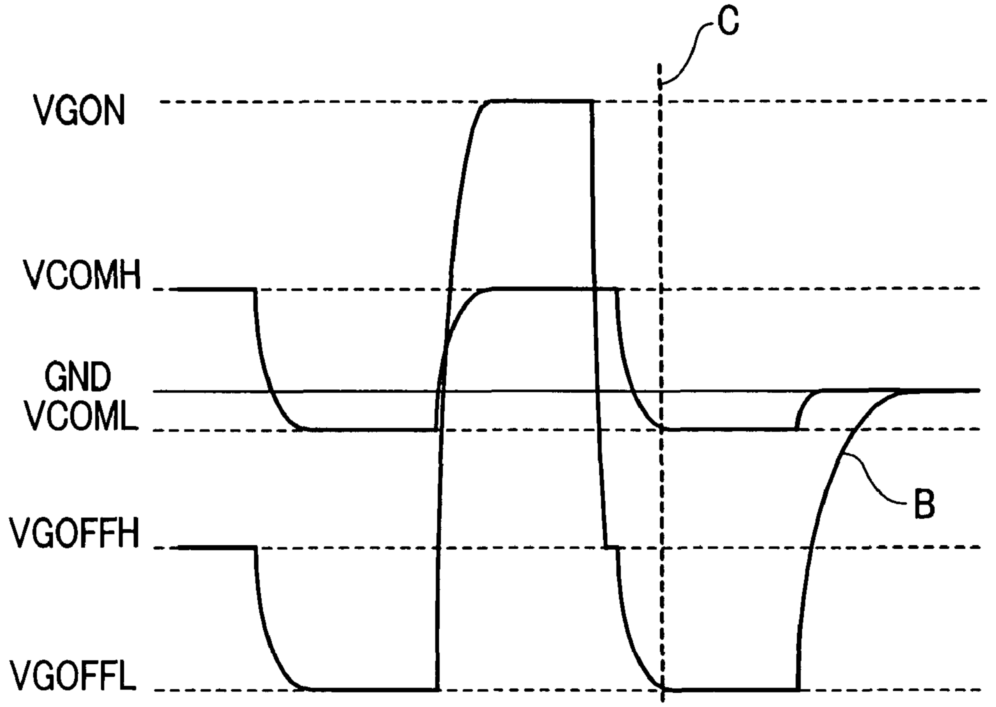

To solve the above-mentioned problem; it is necessary to slowly discharge the charge remaining in the holding capacitance. FIG. 21(*a*) and FIG. 21(*b*) show the manner of change of respective voltages when the charge is slowly discharged. FIG. 21(*a*) shows a case in which the holding capacitance signal of high voltage is supplied to the holding capacitive element and FIG. 21(*b*) indicates a case in which the scanning signal is supplied to the holding capacitive element.

In the drawing, at the timing indicated by symbol C, outputting of the voltage outputted to the counter electrode is stopped at the counter electrode Low level voltage VCOML, and outputting of the voltage which is outputted to the holding capacitive element is stopped at the holding capacitive signal Low level voltage VSTGL in FIG. 21(*a*) and is stopped at the scanning signal OFF Low level voltage VGOFFL in FIG. 21(*b*). Thereafter, the charge remaining in the holding capacitive element is discharged as indicated by symbols A and B in the drawing so as to make the voltage gradually approach the GND potential.

Here, the rate of change of the voltage of the holding capacitive element is required to satisfy the relationship of change rate<(liquid crystal threshold value voltage/frame cycle). When the frame frequency is 60 Hz, the frame cycle is 17 ms. Assuming the threshold value of the liquid crystal as 0.5V, the holding capacitance signal Low level voltage VSTGL of 9V must be lowered at 306 ms. The gradual discharging of the charge can be obtained by connecting a fixed current element to the holding capacitance signal line.

As described previously, the fixed current element 89 is connected to the output of the holding capacitance signal outputting circuit 83 shown in FIG. 17 and hence, the voltage of the holding capacitance signal line is gradually discharged.

Figure 22:
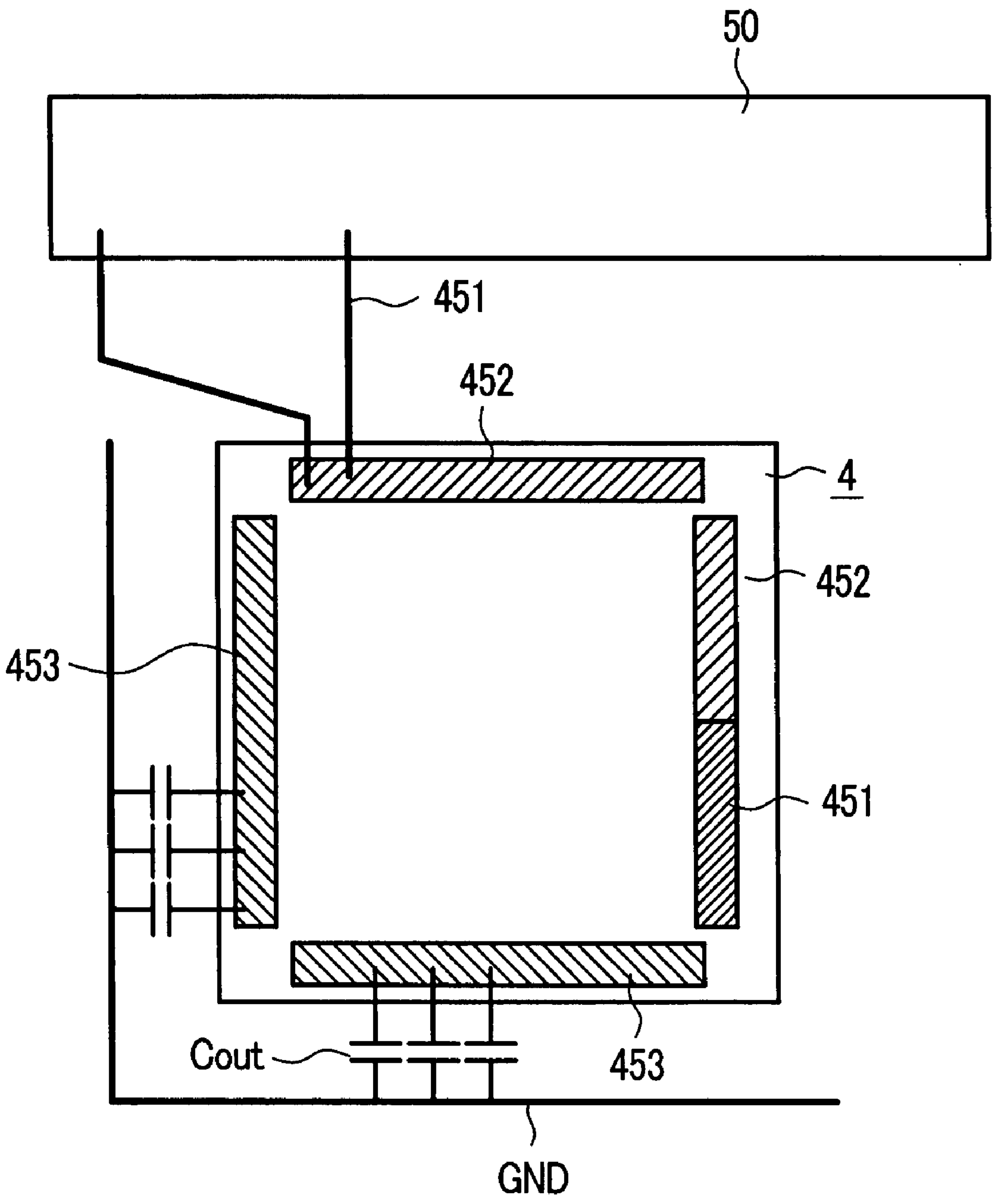
FIG. 22 is a schematic block diagram for explaining the arrangement of terminals of a power source circuit used in the liquid crystal display device of the embodiment of the present invention.

Then, the arrangement of terminals of the power source circuit 4 is shown in FIG. 22. In the drawing, numeral 451 indicates an input terminal region, numeral 452 indicates an output terminal region, and numeral 453 indicates a booster circuit terminal region. The output terminal region 452 is provided at the drive circuit 50 side. To the contrary, the ground potential line GND is arranged such that the ground potential line GND does not cross the line 32 which connects the output terminal region 452 and the drive circuit 50. Further, the booster circuit terminal region 453 is provided at the ground potential line GND side to connect the booster circuit capacitor Cout or the like between the booster circuit terminal region 453 and the ground potential line GND.

To briefly recapitulate the advantageous effects obtained by typical inventions out of inventions disclosed in the present application, they are as follows.

According to the liquid crystal display device of the present invention, it is possible to reduce the mounting area of the drive circuits and hence, it is possible to freely choose the arrangements of the drive circuits.

According to the liquid crystal display device of the present invention, the number of the externally mounted parts can be reduced and hence, it is possible to realize the liquid crystal display device driven by a battery which can be conveniently carried.

What is claimed is:

1. A liquid crystal display device comprising:

a first substrate;

a second substrate;

a liquid crystal composition which is sandwiched between the first substrate and the second substrate;

a plurality of pixel electrodes which are formed on the first substrate;

a plurality of switching elements supplying video signals to the pixel electrodes;

a plurality of video signal lines supplying video signals to the switching elements;

a plurality of scanning signal lines supplying scanning signals for controlling the switching elements;

a first circuit mounted on the first substrate for supplying the video signals to the video signal lines from a plurality of output terminals;

a second circuit formed above the first substrate for distributing the video signals to the video signal lines;

a third circuit supplying the scanning signals to the scanning signal lines during a scanning period;

a power supply circuit mounted on the first substrate for supplying a voltage to the second circuit;

wherein the second circuit includes a distributing switching element for electrically connecting the first circuit and the video signal lines, the power supply circuit generates a voltage for controlling the distributing switching element, and the distributing switching element electrically connects one output terminal of the plurality of output terminals of the first circuit to multiple different video signal lines of the plurality of video signal lines within the scanning period.

2. A liquid crystal display device according claim 1, wherein a distribution control signal line is electrically connected between the power supply circuit and the second circuit.

3. A liquid crystal display device according claim 1, wherein a booster capacitor is electrically connected with the power supply circuit.

4. A liquid crystal display device according claim 1, wherein the power supply circuit supplies a voltage to the third circuit.

5. A liquid crystal display device comprising:

a first substrate;

a second substrate;

a liquid crystal composition which is sandwiched between the first substrate and the second substrate;

a plurality of pixel electrodes which are formed on the first substrate;

a plurality of switching elements supplying video signals to the pixel electrodes;

a plurality of video signal lines supplying video signals to the switching elements;

a plurality of scanning signal lines supplying scanning signals for controlling the switching elements;

a first circuit mounted on the first substrate for supplying the video signals to the video signal lines from a plurality of output terminals a second circuit formed above the first substrate for distributing the video signals to the video signal lines;

a third circuit formed above the first substrate for the scanning signals to the scanning signal lines during a scanning period;

a power supply circuit mounted on the first substrate for supplying a voltage to the second circuit;

wherein the second circuit includes a distributing switching element for electrically connecting the first circuit and the video signal lines, the power supply circuit generates a voltage for controlling the distributing switching element, and the distributing switching element electrically connects one output terminal of the plurality of output terminals of the first circuit to multiple different video signal lines of the plurality of video signal lines within the scanning period.

6. A liquid crystal display device according claim 5, wherein a distribution control signal line is electrically connected between the power supply circuit and the second circuit.

7. A liquid crystal display device according claim 5, wherein a booster capacitor is electrically connected with the power supply circuit.

8. A liquid crystal display device according claim 5, wherein the power supply circuit supplies a voltage to the third circuit.

* * * * *